(12) United States Patent
Hong et al.

(10) Patent No.: US 7,898,541 B2
(45) Date of Patent: Mar. 1, 2011

(54) SYSTEMS AND METHODS FOR TURNING PAGES IN A THREE-DIMENSIONAL ELECTRONIC DOCUMENT

(75) Inventors: Lichan Hong, Mountain View, CA (US); Stuart K Card, Los Altos, CA (US); Jindong Chen, Belmont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1363 days.

(21) Appl. No.: 11/013,405

(22) Filed: Dec. 17, 2004

(65) Prior Publication Data

US 2006/0133664 A1 Jun. 22, 2006

(51) Int. Cl.
*G06T 13/00* (2006.01)

(52) U.S. Cl. .......................................................... 345/473

(58) Field of Classification Search .................. 345/649, 345/473

See application file for complete search history.

(56) References Cited

U.S. PATENT DOCUMENTS

| | | | |
|---|---|---|---|
| 4,831,145 A | | 5/1989 | Weigel et al. |
| 4,860,217 A | | 8/1989 | Sasaki et al. |
| 5,053,762 A | * | 10/1991 | Sarra .............................. 345/641 |
| 5,369,735 A | * | 11/1994 | Thier et al. .................... 345/423 |
| 5,463,725 A | | 10/1995 | Henckel et al. |
| 5,838,326 A | | 11/1998 | Card et al. |
| 5,847,709 A | | 12/1998 | Card et al. |
| 6,340,980 B1 | | 1/2002 | Ho |
| 6,486,895 B1 | | 11/2002 | Robertson et al. |
| 2002/0035697 A1 | | 3/2002 | McCurdy et al. |
| 2003/0020687 A1 | * | 1/2003 | Sowden et al. ............... 345/157 |
| 2003/0052900 A1 | | 3/2003 | Card et al. |
| 2003/0179234 A1 | | 9/2003 | Nelson et al. |
| 2004/0039750 A1 | * | 2/2004 | Anderson et al. .......... 707/103 R |

FOREIGN PATENT DOCUMENTS

| | | |
|---|---|---|
| EP | 0 822 501 A2 | 2/1998 |
| WO | WO 97/22109 | 6/1997 |
| WO | WO 01/42980 A1 | 6/2001 |
| WO | WO 02/01339 A1 | 1/2002 |
| WO | WO 03/040908 A1 | 5/2003 |

OTHER PUBLICATIONS

Ding et al.; Dual Space Drawing Methods for Cones, GRAPHITE '04: Proceedings of the 2nd international conference on Computer graphics and interactive techniques in Australasia and South East Asia, ACM, Jun. 2004.*
U.S. Appl. No. 10/739,175, filed Dec. 2003, Hong et al.
U.S. Appl. No. 10/739,213, filed Dec. 2003, Hong et al.
Beverly L. Harrison, "E-Books and the Future of Reading" May/Jun. 2000, IEEE Computer Graphics and Applications, pp. 32-39.
FlipBrowser; http://web.archive.org/web/20001018000231 /www.flipbrowser.com/home.php, Dec. 22, 2003.

(Continued)

*Primary Examiner* — Xiao M Wu
*Assistant Examiner* — Edward Martello
(74) *Attorney, Agent, or Firm* — Oliff & Berridge, PLC

(57) ABSTRACT

Page turning of a three-dimensional electronic book is modeled as a dynamic animation. The page to be turned may be rotated by rotating it about a base line, and deformed by curling points of the front face of the turning page around the outer side of an imaginary geometric shape.

25 Claims, 18 Drawing Sheets

OTHER PUBLICATIONS

Zinio.com—Same Magazines. New Experience. http://web.archive.org/web/20020527231503/http://www.zinio.com/, Dec. 22, 2003, 2 pages.

Turning the Pages on the web; http://www.bl.uk/cgi-bin/pring.cgi?url=/collections/treasures/digitisation.html, Sep. 22, 2003, The British Library—The world's knowledge.

Stuart K. Card, George G. Robertson, and William York, The WebBook and the Web Forager: An Information Workspace for the WorldWide Web, Proceedings of CHI '96, pp. 111-117; 10 pgs., Apr. 13-18, 1996.

Y.C. Chu, I.H. Witten, R. Lobb, D. Bainbridge, "How to Turn the Page," Proceedings of JCDL '03, pp. 186-188, Mar. 2003.

L. Denoue, L. Nelson, E. Churchill, "A Fast Interactive 3D Paper-Flier Metaphor for Digital Bulletin Boards," Proceedings of UIST '03, pp. 169-172, Nov. 2-5, 2003.

Stuart K. Card, Lichan Hong, Jack Mackinlay, Ed Chi; "3 Book: A Scalable 3D Virtual Book," Late Breaking Results, CHI 2004, 4 pgs., Apr. 24-29, 2004.

Michel Beaudouin-Lafon, "Novel Interaction Techniques for Overlapping Windows," UIST, Nov. 11-14, 2001, pp. 153 and 154, France.

* cited by examiner

SYSTEMS AND METHODS FOR TURNING PAGES IN A THREE-DIMENSIONAL ELECTRONIC DOCUMENT

BACKGROUND

It is becoming increasingly popular to read in electronic form documents that have traditionally been available only in paper form, such as magazines, journals, such as trade journals and scientific journals, textbooks, photographic albums, newspapers and the like. However, many readers are reluctant to read these documents in electronic form because the electronic documents lack characteristics of paper documents to which the readers have become accustomed.

Techniques replicating characteristics of paper documents in electronic documents (also referred to herein as "virtual books") is highly desirable. Virtual books may include a broad range of documents and include simulations of physical books such as magazines, journals, textbooks, photograph albums, newspapers or the like. Virtual books can be displayed by e.g., e-book systems, personal computers (PCs), personal digital assistants (PDAs), or the like.

Virtual book display systems, e.g., e-book systems, PCs, PDAs, or the like display virtual books in a two-dimensional ("2D") manner or a three-dimensional ("3D") manner. For example, B. Harrison describes several 2D-based e-book devices in "E-Books and the Future of Reading", IEEE Computer Graphics and Applications, Vol. 10, No. 3, pages 32-39. It will be appreciated that, as used throughout the present disclosure, "three-dimensional" typically refers to implementation of a three-dimensional appearance of an object on a two-dimensional display, e.g., the display screen of a computer or the like.

Modern graphics systems provide ways to represent virtual books on a computer screen by creating a 3D appearance of a physical book. Displaying virtual books in a 3D manner provides a more realistic appearance of an actual physical book when compared to displaying virtual books in a 2D manner. 3D virtual books have many potential uses, such as, for example, the representation of historical manuscripts, the representation in electronic bookstores of books for sale, electronic book publishing, the basis of new forms of medical textbooks and other enhanced book formats, new forms of laboratory journals, and photograph albums.

A limitation on the ability of a virtual book to appear to a viewer as an actual physical book is at times limited to the appearance of the page while the page is being turned along with the page turning technique used by a virtual book display system. Realistic page turning can give readers and viewers the impression of reading or viewing an actual physical book. Since page turning is a dynamic animation that not only starts, but also finishes with the book in a static opened or closed position, how the static positions of the book are represented affects, to a large degree, how the book should be represented during the page turning animation, and vice versa.

There are various e-book systems for displaying electronic documents in a 3D manner. For example, U.S. Pat. No. 6,340,980 describes a special user interface device mimicking an actual physical book. When connected to a computer, this device works like any other user interface device such as a mouse. A software product, known as the Flip Browser®, has been developed by E-Book Systems Inc., and can be found at http://www.flipbrowser.com.

Additionally, U.S. Patent Application Publication No. 20020035697 describes systems and methods for distributing and viewing electronic documents. A software product, known as the Zinio Reader®, has been developed by Zinio Systems Inc., and can be found at http://www.zinio.com. Another system, the Turning the Pages® system is based on a multimedia authoring product called Macromedia. The Turning the Pages® system is jointly developed by the British Library and Armadillo Systems, and can be found at http://www.bl.uk/whatson/exhibitions/lindisfame/ttp.html.

Although the above describe and/or display electronic documents in a 3D manner, the disclosures regarding the page turning feature for virtual books displayed in a three-dimensional manner are limited to little or no detail of how the page turning features are designed or implemented.

U.S. Pat. Nos. 5,847,709 and 5,838,326 describe another system, commercially known as the WebBook® developed by Xerox Corporation, for displaying electronic documents in a three-dimensional manner. Although the page turning animation of the WebBook® appears very similar to the page turning of an actual physical book, there are several drawbacks.

For example, an opened virtual book only models the top faces of the book, not the back side. Therefore, in a virtual environment where the back side or bottom faces, such as, for example, the front and back covers, of an opened virtual book are visible to the virtual camera, the virtual book may no longer resemble an actual physical book. A virtual camera is an imaginary device that may correspond to the reader's eye. The virtual camera displays the reader's view of the object, e.g. a virtual book, on the screen. Transitioning between a closed book and an opened book requires changing between the closed book representation and the opened book representation.

U.S. patent application Ser. No.10/739,175, the disclosure of which is incorporated herein by reference in its entirety, discloses a method for turning pages of a 3-dimensional electronic document having a predetermined length, a predetermined width and a predetermined thickness. The method may include, selecting a number of pages of the 3-dimensional document to be turned, each of the pages having a predetermined thickness; animating, relative to predetermined coordinates of a static base line, movement of a first 3-dimensional object, a second 3-dimensional object connected to the first 3-dimensional object at a first connection point, and a third 3-dimensional object connected to the second 3-dimensional object at a second connection point; and maintaining the first connection and the second connection while animating the movement of the first 3-dimensional object, the second 3-dimensional object and the third 3-dimensional object.

Additionally, WebBook® include a page ruffling technique that simulates the multiple concurrent turning of a set of pages of the WebBook®. The pages to be turned are represented by multiple turning pages blocks. However, although the page ruffling technique provides the capability to rapidly scan through a set of pages for information of interest, the ruffling technique requires that the textures of all of the pages being turned be displayed. The texture of the page includes the images shown on the page and may include both low and high resolution images. Therefore, in WebBook®, all of the page textures are pre-loaded and stored in the main memory. Preloading and storing all of the page textures in the main memory severely limits the scalability of the system and restricts the number of pages allowed in a virtual book. Furthermore, it is difficult to determine, even approximately, the amount of pages being turned during the page ruffling.

SUMMARY

It is desirable to implement a page turning feature in a virtual book displayed in 3D that can realistically represent the turning of pages of an actual physical book.

Exemplary embodiments of this invention provide systems and methods that allow the pages of 3D virtual books to be turned forwards or backwards in a manner that represents the turning of pages of an actual physical book.

Exemplary embodiments provide systems and methods that allow a left side pages block and a right side pages block of a 3D virtual book to be moved relative to a top face base line.

Exemplary embodiments provide systems and methods that allow a turning pages block of a 3D virtual book to be moved relative to a top face base line and a geometric shaped object.

Exemplary embodiments provide systems and methods that turn the pages of a 3D virtual book forward or backward in a manner that realistically represents turning pages of an actual physical book. The pages being turned may be merged with the pages located in the left side or the right side of the opened 3D virtual book without producing a visual discontinuity.

In exemplary embodiments, the top, bottom, left, right, front and/or back faces of a turning pages block of the 3D virtual book are modeled as having curved surfaces.

In exemplary embodiments, an opened 3D virtual book is modeled as a left side pages block and a right side pages block. The left side pages block represents the left side of an opened book with respect to the book binding while the right side page block represents the right side of an opened book with respect to the book binding. When the book is opened, these two blocks may be connected at a common boundary and have top faces which lie on a top face base line. Just prior to pages being turned, another 3D object representing a turning pages block is created in the left or right side pages block in order to represent the portion of the pages to be turned. Throughout the page turning animation, the left side pages block, the turning pages block and the right side pages block gradually rotate, translate and/or deform relative to the top face base line and a geometric shape while maintaining common connection points. Moreover, throughout the page turning animation, the turning pages block deforms by curling around the imaginary geometric object. Curling is a process by which the points of the turning pages block are mapped to corresponding points on the geometric object. The size of the geometric object may change as the turning pages block rotates from one side of the book to the other side of the book. The rotation, translation, and/or deformation of the left side pages block, the turning pages block and the right side pages block produce a realistic effect of page turning in the 3D virtual book. At the end of the page turning animation, the turning pages block is merged into either the left side pages block or the right side pages block of the 3D virtual book to return the book to a static state.

These and other features and advantages of the invention are described in or are apparent from the following detailed description of the systems and methods of various exemplary embodiments.

BRIEF DESCRIPTION OF THE DRAWINGS

Exemplary embodiments will be described in detail, with reference to the following figures in which like reference numerals refer to like elements and wherein.

DETAILED DESCRIPTION

Figure 1:
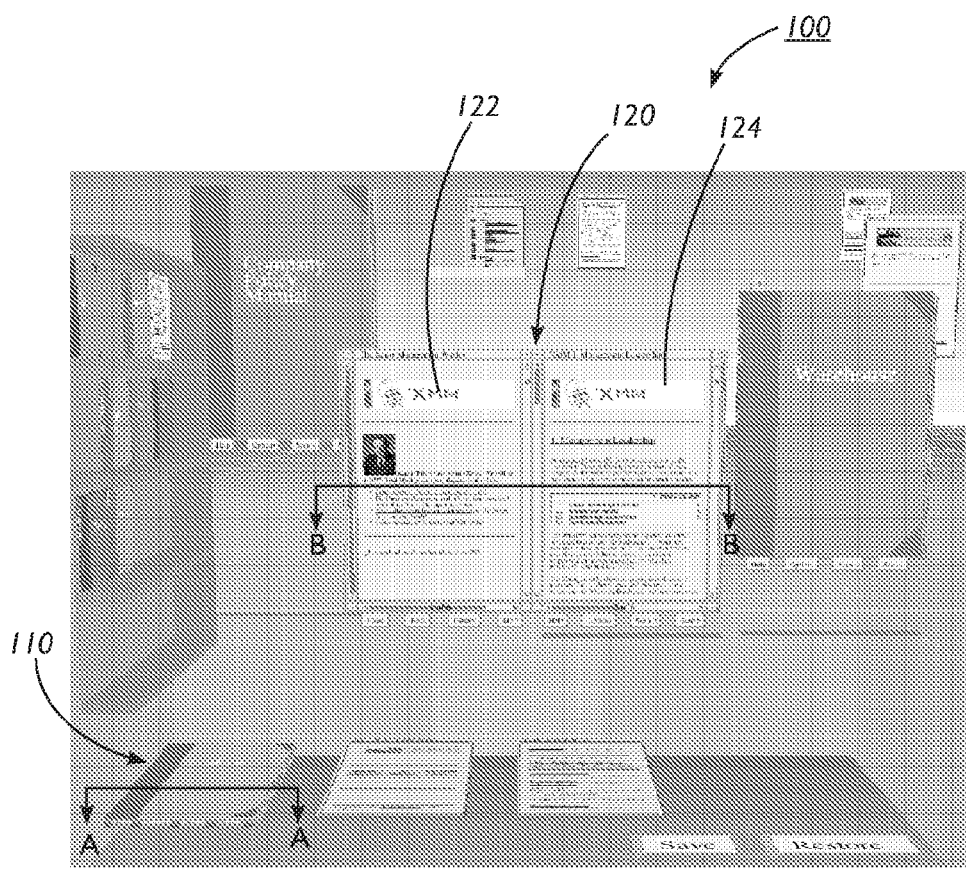
FIG. 1 illustrates an embodiment of a virtual environment containing three-dimensional electronic books, some displayed in an opened position and some displayed in a closed position.

Although the page turning of 3D virtual books may appear somewhat similar to the page turning of actual physical books, there are several shortcomings in the page turning features of 3D virtual books. For example, as shown in FIG. 1, a virtual environment 100 containing 3D virtual books, such as WebBooks®, looks reasonably realistic when a closed virtual book 110 or the top faces 122,124 of an opened virtual book 120 are viewed with a virtual camera. In Web-Book®, a closed virtual book 110 models the top face and part of the bottom face of the book, while an opened virtual book 120 models the top faces 122,124 of the book.

Figure 2:
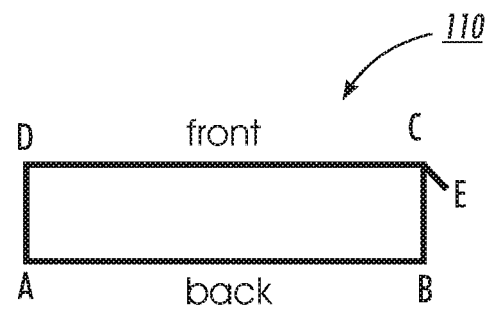
FIG. 2 illustrates a cross-section of a three-dimensional electronic book, taken along line A-A of FIG. 1, in a closed position.
Figure 3:
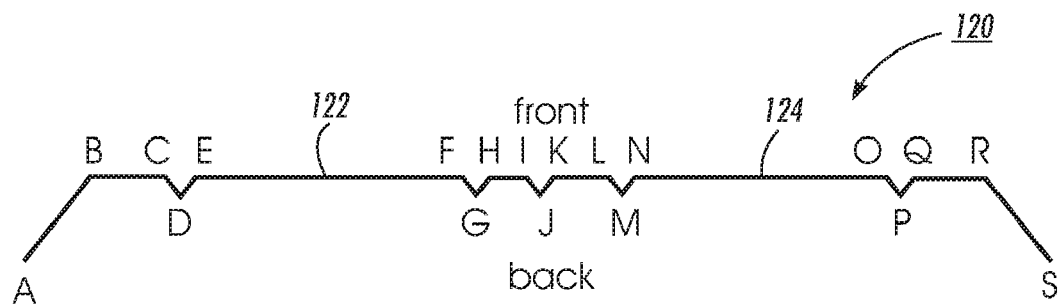
FIG. 3 illustrates a cross-section of a three-dimensional electronic book of FIG. 1 in an opened position.

FIG. 2 shows the cutting plane of a closed WebBook®, taken at line A-A in FIG. 1, as a rectangular box ABCD. FIG. 3 shows the cutting plane of an opened WebBook®, taken at line B-B in FIG. 1, as line A-S (including line segments A-B, B-C, C-D, etc.), respectively. The book cutting plane is where the book is cut in half in a direction perpendicular to the front and back faces, e.g., covers, of the book. As shown in FIG. 3, the opened virtual book 120 models the top faces 122,124 of the book and not the back side. In a virtual environment displaying an opened virtual book, the back side or bottom faces, such as, for example, the front and back covers, may be visible to the virtual camera. Transitioning between a closed book 110 and an opened book 120 requires changing between the closed book representation of FIG. 2 and the opened book representation of FIG. 3.

Figure 4:
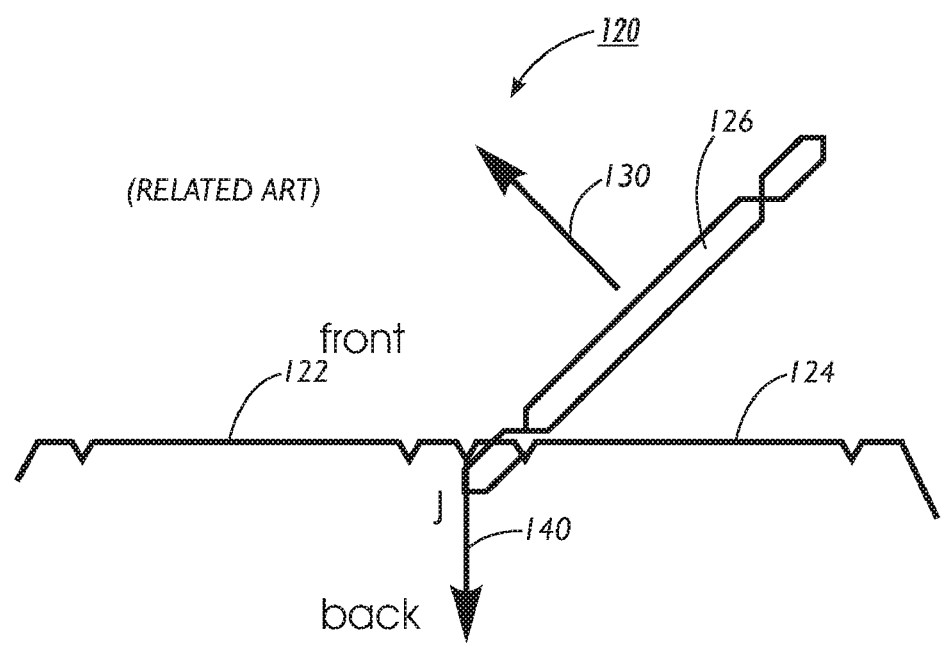
FIG. 4 illustrates a cross-section of exemplary page turning to rotate the book's pages in a three-dimensional electronic book of FIG. 1.

FIG. 4 shows modeling of a turning pages block 126 representing the pages of the WebBook® being turned. As the turning pages block 126 rotates in the direction of arrow 130, point J moves in the direction of arrow 140 until the turning pages block has turned 90 degrees from an initial starting position. Point J then travels back in a direction opposite to arrow 140 until the turning pages block 126 has rotated 180 degrees from the initial starting position.

The WebBook® also includes a page ruffling technique (not shown) that simulates the multiple concurrent turning of a set of pages of the WebBook®. The pages to be turned are represented by multiple turning pages blocks. However, although the page ruffling technique provides the capability to rapidly scan through a set of pages for information of interest, the ruffling technique requires that the textures of all of the pages being turned to be displayed. Therefore, in WebBook® all of the page textures are pre-loaded and stored in the main memory. Pre-loading and storing all of the page textures in the main memory severely limits the scalability of the system, restricting the number of pages allowed in a virtual book. Furthermore, it is difficult to determine, even approximately, the number of pages being turned during the page ruffling.

Figure 5:
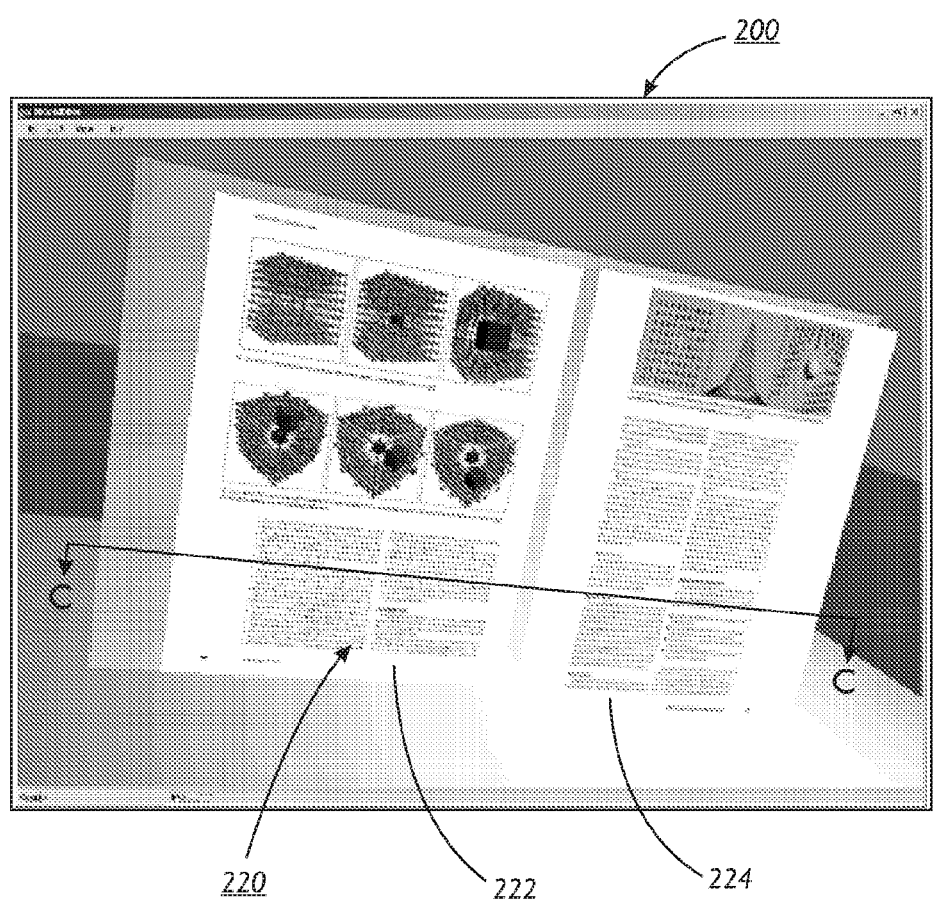
FIG. 5 illustrates an embodiment of a virtual environment containing a three-dimensional electronic book in an opened position.
Figure 6:
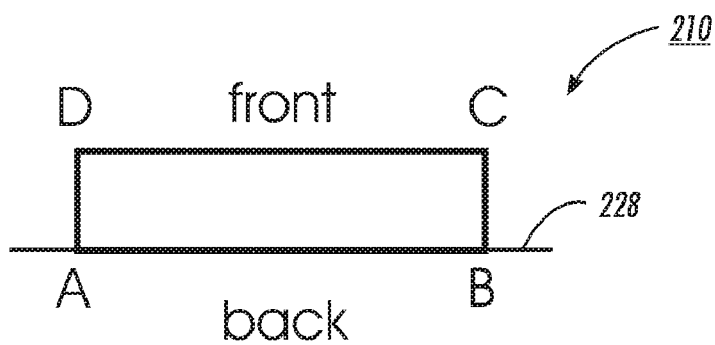
FIG. 6 illustrates a cross-section of the three-dimensional electronic book of FIG. 5 in a closed position.

Other three-dimensional virtual books have also attempted to model turning the pages of an actual physical book. For example, FIG. 5 shows a virtual environment 200 containing a three-dimensional virtual book in an opened position 220 with pages on the left and right sides 222, 224. FIG. 6 shows the cutting plane, of the three-dimensional electronic book in a closed book position 210, as a rectangle ABCD. The virtual book also has a static base line 228 along line A-B and located at a bottom plane of the book in the closed position 210. The static plane is used during page turning as a static reference line that assists in determining the relative movement of the pages of the virtual book. The terms "front" and "back" refer to the side of the cutting plane where the front cover and the back cover are located, respectively. A reader may view the front side from a location above the front side.

Figure 7:
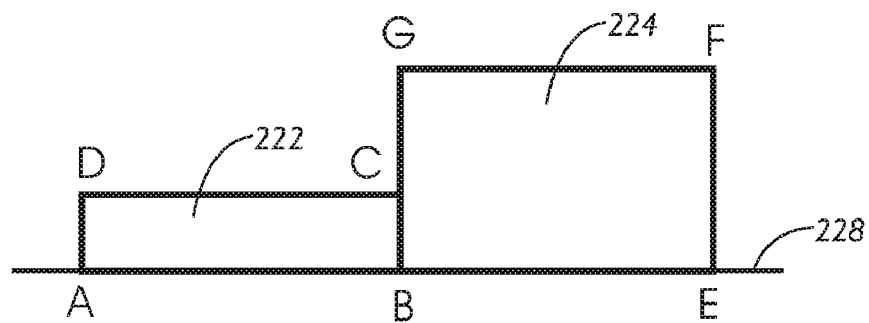
FIG. 7 illustrates a cross-section of the three-dimensional electronic book of FIG. 5 in an opened position.

FIG. 7 shows the cutting plane, taken at line C-C in FIG. 5, of the three-dimensional book in the opened position 220. As shown in FIG. 7, an opened virtual book is modeled as at least a left side pages block 222 and a right side pages block 224 represented by rectangular polygons ABCD and BEFG, respectively. The static base line 228, corresponding to line A-E, located at a bottom plane of the opened book 220, is used during page turning as a static reference line that assists in determining the relative movement of the pages of the virtual book.

Figure 8:
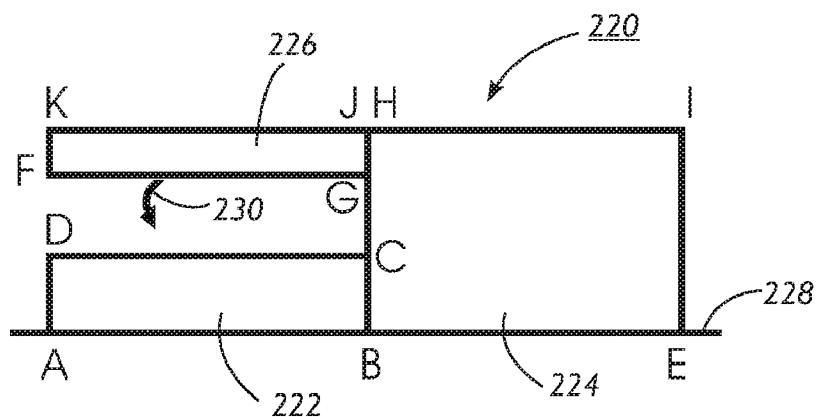
FIG. 8 illustrates a cross-section of exemplary page turning to rotate a turning pages block in the three-dimensional electronic book of FIG. 5.

FIG. 8 shows modeling of a turning pages block 226 representing the pages of the virtual book being turned. During the page turning animation, the bottom faces, corresponding to lines A-B and B-E, of the left side pages block 222 and the right side pages block 224, respectively, remain stationary on the base line 228, and the turning pages block 226 rotates in the direction of arrow 230 around the connection point J,H.

Modeling the three-dimensional virtual book as rectangles positioned relative to the bottom face base line 228 contains several drawbacks. First, the dropping of the turning pages block 226 at the end of the animation leads to a visual discontinuity. Second, as the virtual book is turned from one page to another, the locations of the top faces of the left side pages block 222 and the right side pages block 224 change dynamically. This means that the relative distances between a static camera and the top pages of the virtual book are not constant, which makes the top pages of the opened book appear as different sizes depending on which two pages are being displayed. Third, as the pages are turned, the pages remain flat.

The following detailed discussion is directed to specific applications, namely three-dimensional electronic books, with which the exemplary embodiments of page turning systems and methods of this invention are usable. However, it should be appreciated that this is for the ease of understanding and familiarity only, and should not be interpreted as limiting the types of applications with which the systems and methods of the exemplary embodiments are usable.

Page turning methods and systems include three concurrent processes, namely 1) a rotation process, 2) a translation process, and 3) a deformation process. The rotation process gradually rotates a page or group of pages, referred to as a turning pages block, around a fulcrum, such as a virtual book binding, from one side of a book to the other side of a book along a page turning travel path. The page turning travel path includes the locus of the different locations of the page as the page rotates around a fulcrum (e.g., binding) from one side of a book to the other side of a book. It should be appreciated that the fulcrum need not be fixed, but may move relatively to the rest of the book, as described above with reference to FIG. 4. In the example shown in FIGS. 14-16, the cross-section of the turning pages block, i.e., parallelogram JKGC, viewed in a cutting plane perpendicular to the binding of the book, is viewed as rigid and unrealistic. The deformation process, in exemplary embodiments of the invention, is directed to creating a more realistic view of the turning pages block, i.e., parallelogram JKGC, by realistically deforming the turning pages block during page turning.

Figure 21:
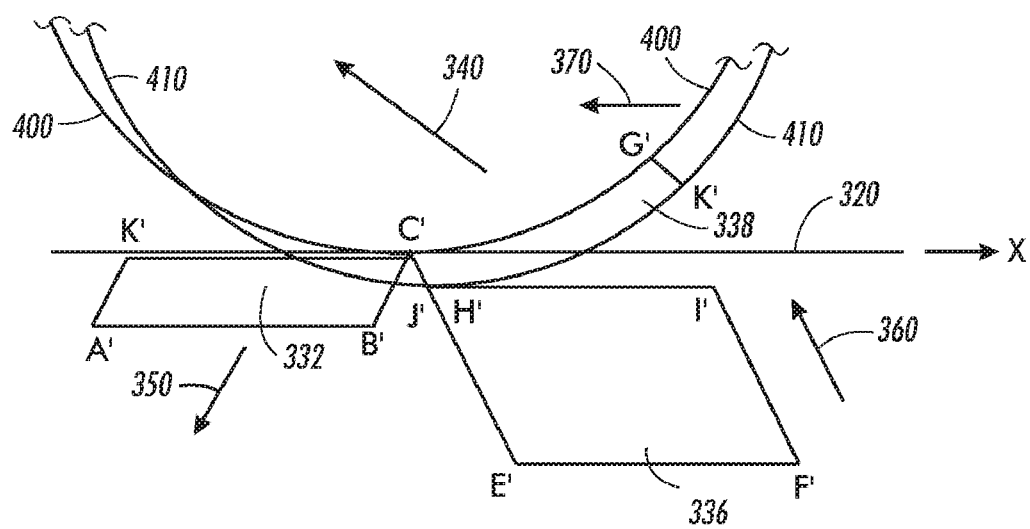
FIG. 21 illustrates exemplary page turning of the three-dimensional electronic book of FIG. 11 using the imaginary geometric shape shown in FIG. 19 to rotate the turning pages block counter-clockwise.

In the deformation process of exemplary embodiments, the top and bottom faces of the turning pages block are curled around imaginary geometric shapes, such as, for example, cones. The geometric shape for one face (e.g., the top face) may have the same dimensions as the geometric shape for the other face (e.g., the bottom face). For ease of understanding, the following disclosure assumes that the geometric shape corresponding to one face (e.g., the top face) has the same dimensions as the geometric shape for the other face (e.g., the bottom face). Each geometric shape's size changes as the pages travels along a travel path from one side of the book to the other side of the book to produce various curved shapes at different frames, i.e., different points along the page turning path. When the translation process, rotation process and deformation process are concurrently operated the cross-section of the turning pages block, i.e., curved object JKGC shown in FIG. 21, is viewed by a reader as flexible. As such, the page turning is more realistic.

Figure 9:
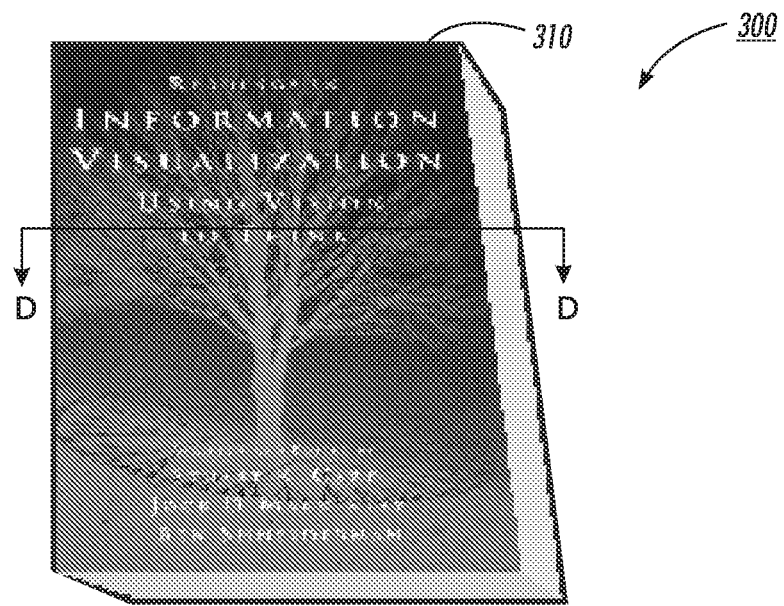
FIG. 9 illustrates an embodiment of a closed three-dimensional electronic book.
Figure 10:
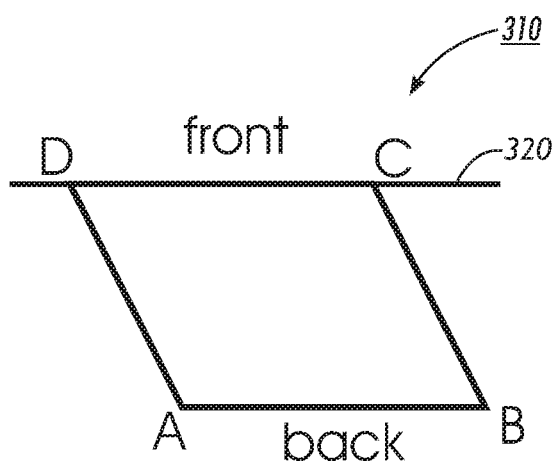
FIG. 10 illustrates a cross-section of the three-dimensional electronic book of FIG. 9 in a closed position.

FIG. 9 illustrates an exemplary embodiment of a three-dimensional electronic book 300 in a closed position 310. FIG. 10 illustrates the cutting plane of the exemplary embodiment of the three-dimensional electronic book of FIG. 9 taken at line D-D. Since the length of the virtual book 300 is the length of an individual page such as, for example, the distance between the top edge of the page and the bottom edge of the page, the length of the virtual book 300 remains constant throughout the page turning anination.

As illustrated in FIG. 10, the closed book 310 is represented as a parallelogram ABCD. The terms "front" and "back" refer to the side of the cutting plane where the front cover and back cover are located, respectively. A reader may view the "front" side from a location above the front side. The width of the book, e.g., the length of lines A-B and D-C, may be determined by the width of an individual page, or by the width of the front or back cover. The thickness of the book, e.g., the shortest distance between line D-A and line C-B, is determined by the thickness of the cumulative number of pages in the book, and the thickness of the front and back covers. The slanting angles ABC and ADC may be predefined constants. The virtual book 300 may also have a static base line 320, corresponding to line DC and located at a top plane, e.g., front face, of the closed book 310, which is used during page turning as a static reference line that assists in determining the relative movement of the pages of the virtual book 300.

Figure 11:
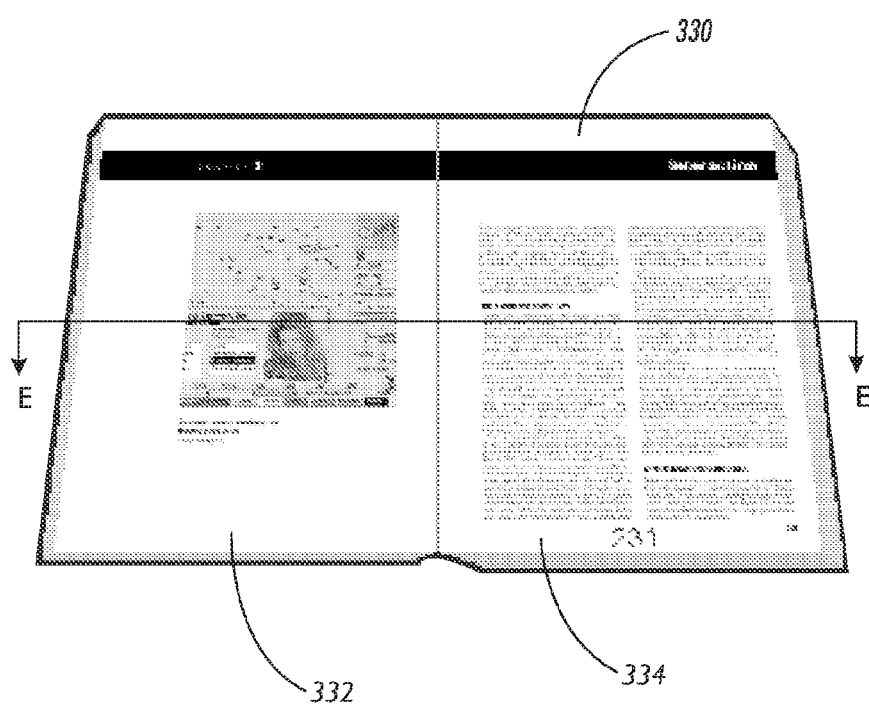
FIG. 11 illustrates an exemplary embodiment of a virtual environment containing an opened three-dimensional electronic book.
Figure 12:
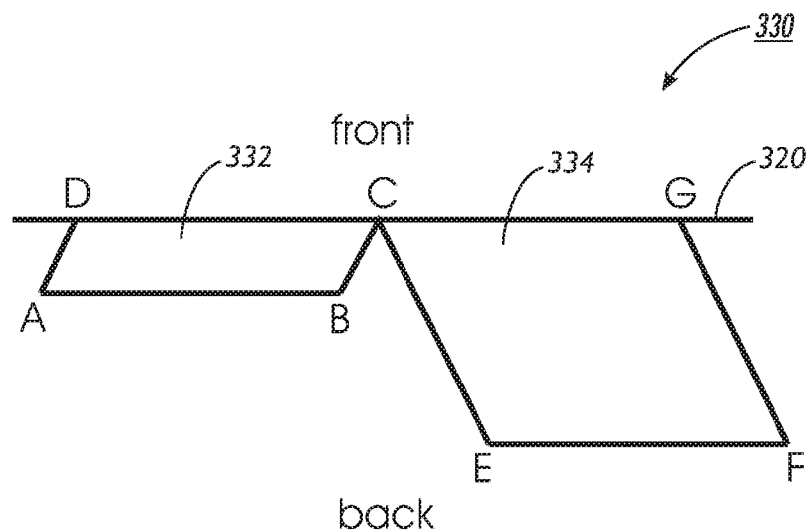
FIG. 12 illustrates a static state cross-section of page turning of the three-dimensional electronic book of FIG. 11.

FIG. 11 illustrates an exemplary embodiment of the three-dimensional electronic book 300 of FIG. 9 in an opened position 330 and displays the three-dimensional electronic book 300 in a perspective view showing the thickness of the left side 332 and the right side 334 of the book 300. The thickness of the left side 332 and right side 334 of the book 300 represents the number of pages on the left and right sides 332,334 of the opened book 330, respectively. FIG. 12 illustrates the cutting plane, taken at line E-E in FIG. 11, of the exemplary embodiment of the three-dimensional electronic book 300 in the opened position 330. In FIG. 12 static base line 320 corresponds to line E-E in FIG. 11 and the front face of the pages being viewed.

As illustrated in FIG. 12, a static state of the exemplary embodiment of the three-dimensional electronic book 300 in the opened position 330 of FIG. 11 is modeled as including at least two pages blocks. Specifically, the left side pages block 332 is represented by a parallelogram ABCD, and the right side pages block 334 is represented by another parallelogram EFGC. While parallelograms are depicted, it is not necessary that the pages blocks be parallelograms. In this and other figures, more relaxed shapes are also acceptable. The left side pages block 332 and the right side pages block 334 connect at point C. Point C corresponds to the book binding. Similar to the virtual book 300 in the closed position 310, shown in FIG. 9, the width of the left side pages block, corresponding to line A-B, and the width of the right side pages block, corresponding to line E-F, may be determined by the width of an individual page. Also, similar to the virtual book 300 in the closed position 310, as shown in FIG. 9, the thickness of the left side pages block, e.g., the distance between line D-C and line A-B, and the thickness of the right side pages block, e.g., the distance between line C-G and line E-F, may be determined by the thickness of an individual page and the cumulative number of pages in each of the blocks. The static base line 320 of the virtual book 300 may be located at a top plane corresponding to the top faces of the book as viewed by a reader and may correspond to line DCG of the opened book 330. The static base line 320 may be used during page turning as a static reference line and assists in determining the relative movement of the pages of the virtual book 300. The terms "front" and "back" refer to the side of the cutting plane a reader views. For example, in the embodiment shown in FIG. 12, a reader views the open pages of the book when the book is viewed from the "front" side. The "back" side, on the other hand, is hidden from the viewer's view.

The dimensions mentioned above are intrinsic properties of the book calculated and/or determined by various methods and systems known to those skilled in the art. For example, since a length, a width and a thickness of an individual page of the closed virtual book may be predetermined, a thickness of the closed virtual book may also be predetermined and equal to total number of pages in the closed virtual book multiplied by the thickness of the individual page. A value can be added to the thickness calculation to account for the cover, along with other parts of a book, e.g., pages, that may have a thickness different than an individual page. Additionally, since the number of pages in the left side pages block and the right side pages block during the static state of FIG. 12 may be predetermined, the coordinates or points of the left side pages block and the right side pages block relative to the static base line may also be predetermined. Further, the location of the virtual book in the virtual environment is also predetermined. Since many dimensions and coordinates are predetermined, when a book is selected by the reader for viewing, the geometry of the book, such as, for example, the coordinates of the points of the blocks in FIGS. 10 and 12 and the location of the static base line are preferably predetermined. Therefore, the reader only needs to select the virtual book to be viewed and the number of pages of the virtual book to turn forwards or backwards.

The following detailed description illustrates an embodiment of a sequence of positions of the pages as the pages of the three-dimensional electronic book 300 of FIG. 11 (or FIG. 12) are rotated. The exemplary embodiment illustrates rotating pages of a virtual book in a forward or counter-clockwise direction; however, it should be appreciated that the pages of the virtual book can also be rotated in a backward or clockwise direction, or other directions depending on the location of the book binding. It should also be appreciated that one or more pages of a book can be rotated at the same time.

Before rotating the pages of the book forward (e.g., in a counter-clockwise direction), the number of pages to be turned is determined. The page turning system determines a portion, representing the number of pages to be turned, of the right side pages block 334 that needs to be turned from the right side of the book to the left side of the opened virtual book 330.

Figure 13:
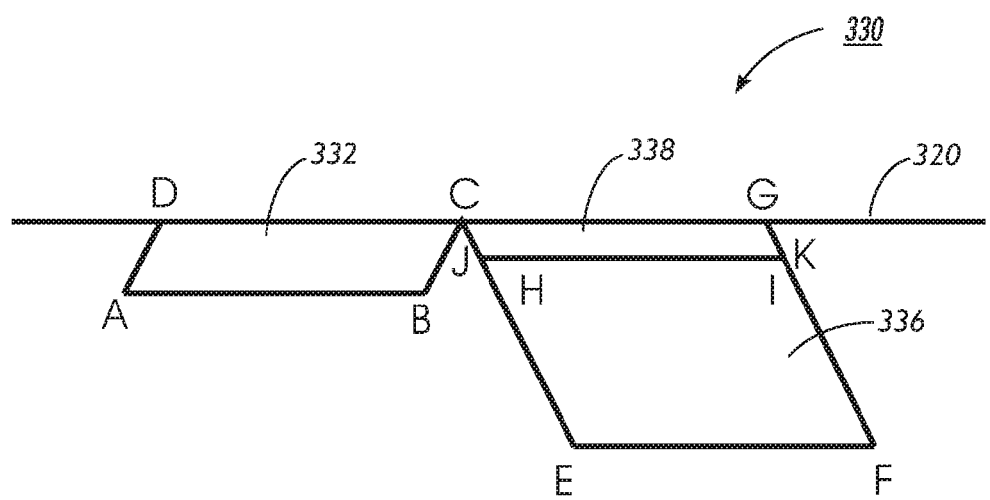
FIG. 13 illustrates exemplary page turning of the three-dimensional electronic book of FIG. 11 including a turning pages block at the beginning of forwarding pages.

FIG. 13 illustrates the beginning of the page turning animation of the virtual book 330 with the pages in an initial page turning position. First, the right side pages block 334 is split into a first portion representing the number of pages to be turned and a second portion representing the pages that remain in the right side pages block after the first portion has been removed. The first portion is a turning pages block 338 represented by the parallelogram JKGC. The thickness, e.g., the distance between line J-K and line C-G, of the turning pages block 338, may be determined by multiplying the number of pages to be turned and the thickness of an individual page. Further, the second portion, a new right side pages block 336, represented by parallelogram EFIH, illustrates the difference between the previous right side pages block 334 and the turning pages block 338. The second portion is not turned in this animation. Finally, the top face, corresponding to line D-C of the left side pages block 332, and the top face, corresponding to line C-G of the turning pages block 338, may be co-linear with the static base line 320. Line C-J represents the portions of the virtual book's binding that will be turned.

FIGS. 14-17 illustrate exemplary states of the 180 degrees counter-clockwise rotation of the turning pages block 338 in which the turning pages block has rotated 45, 90, 135, and 180 degrees counter-clockwise, respectively, with regard to the initial starting position of FIG. 13. During the rotation of the turning pages block 338, the top face corresponding to line D-C of the left side pages block 332 and the top face corresponding to line C-G of the turning pages block 338 do not line up with the static base line 320. The following discussion describes the movement of the left side pages block 332, the right side pages block 336, and the turning pages block 338 in greater detail.

As illustrated in FIGS. 14-17, the turning pages block 338 rotates, in the direction of arrow 340, around the point J,H. At the same time, the point J,H starts to move towards the static base line 320 along an upward direction towards the position where point C was located at the beginning of the animation, i.e., along the direction of line J-C of FIG. 13. However, throughout the animation, the left side pages block 332 and the turning pages block 338 remain connected at point C resulting in a downward translation 350 of the left side pages block 332 away from the static base line 320. Similarly, concurrent with the movement of the left side pages block 332, the right side pages block 336 and the turning pages block 338 remain connected at the point J,H which results in an upward translation 360 of the right side pages block 336 towards the static base line 320.

Figure 16:
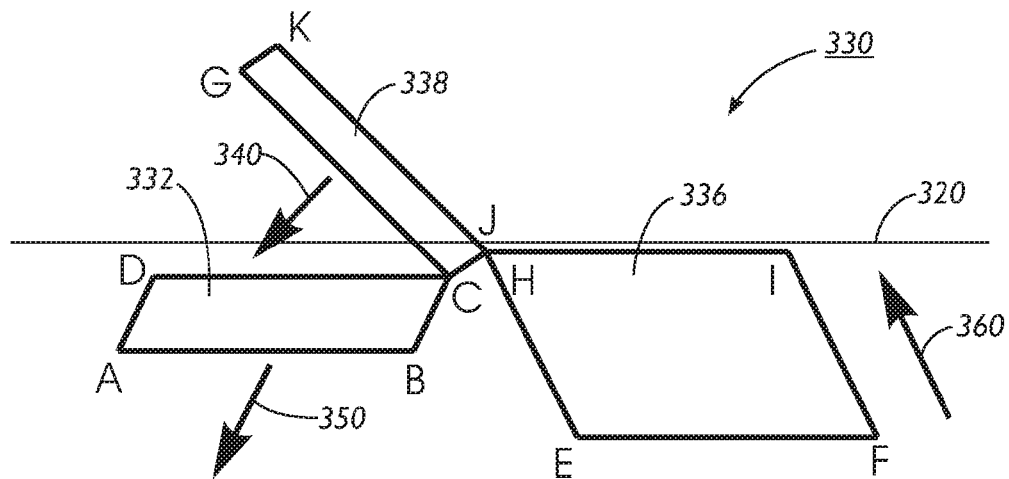
FIG. 16 illustrates exemplary page turning of the three-dimensional electronic book of FIG. 11 rotating the turning pages block 135 degrees counter-clockwise.

As the page turning animation proceeds, the slanting angle CJK of the turning pages block 338 gradually changes from an obtuse angle in FIG. 13 into an acute angle in FIG. 16. However, the thickness, i.e. the distance between lines C-J and G-K, of the turning pages block 338 remains constant.

Figure 17:
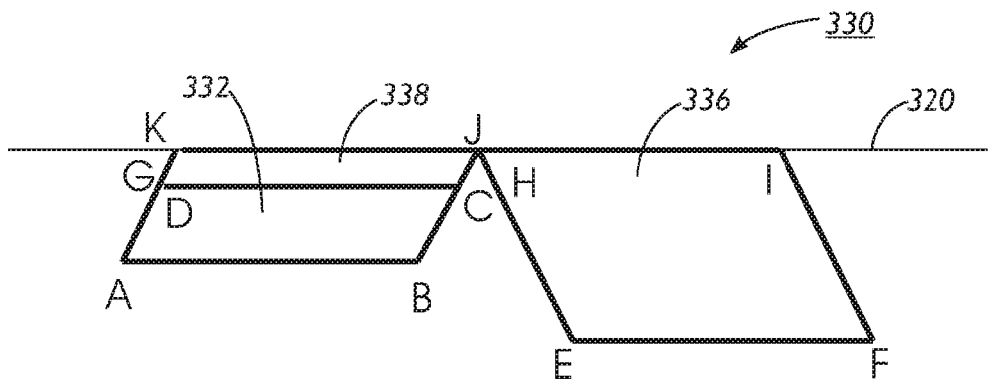
FIG. 17 illustrates exemplary embodiment of page turning of the three-dimensional electronic book of FIG. 11 rotating the turning pages block 180 degrees counter-clockwise.

As shown in FIG. 17, after the turning pages block 338 has rotated 180 degrees counter-clockwise from the initial page turning position, the side faces corresponding to lines B-C and A-D of the left side pages block 332 may become collinear with the side faces corresponding to lines C-J and G-K of the turning pages block 338, respectively. Additionally, the top face corresponding to line K-J of the turning pages block 338 and the top face corresponding to line J-I of the right side pages block 336 may be collinear with the static base line 320.

Figure 18:
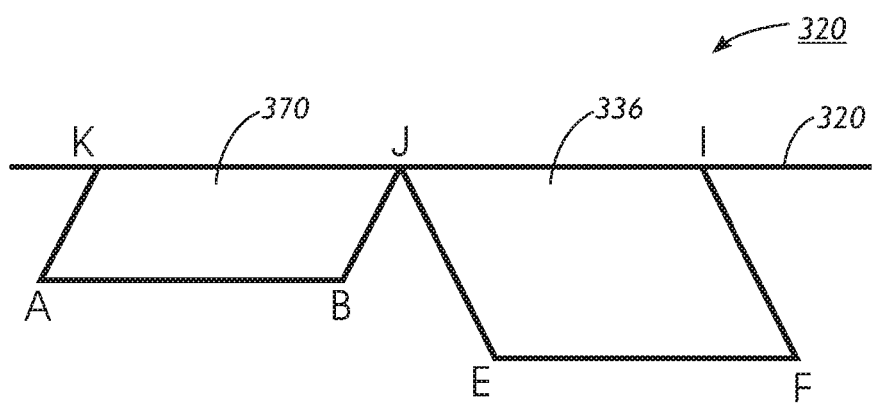
FIG. 18 illustrates exemplary page turning of the three-dimensional electronic book of FIG. 11 at the end of rotating the turning pages block.

FIG. 18 illustrates a modeling of the exemplary embodiment of the three-dimensional electronic book 300 in an opened position at the end of the page turning animation. As shown in FIG. 18, a new left side pages block 370 is created as a result of merging the turning pages block 338 with the left side pages block 332 of FIG. 17. Thus, the top face corresponding to line K-J of the new right side pages block 370 and the top face corresponding to line J-I of the right side pages block 336 are collinear with the static base line 320.

Figure 14:
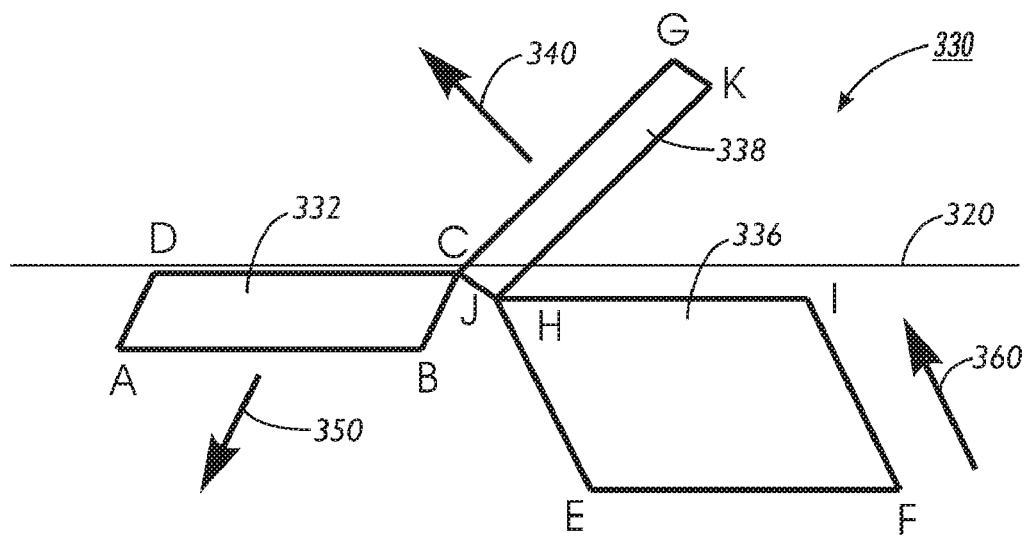
FIG. 14 illustrates exemplary page turning of the three-dimensional electronic book of FIG. 11 rotating the turning pages block 45 degrees counter-clockwise.
Figure 15:
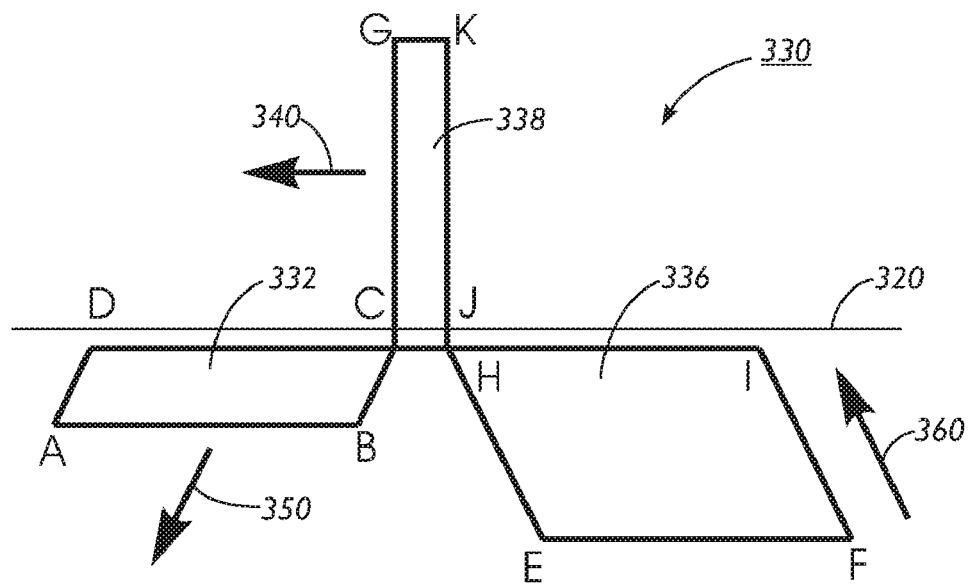
FIG. 15 illustrates exemplary page turning of the three-dimensional electronic book of FIG. 11 rotating the turning pages block 90 degrees counter-clockwise.

The embodiments disclosed in FIGS. 14-16 show a rigid turning pages block 338. However, as discussed above, when the techniques disclosed in FIGS. 14-16 are used to turn a page, a somewhat unrealistic page turning effect is created because the top and bottom faces of the turning pages block, as viewed by a reader, remains as flat surfaces during page turning. Because the flat faces of the turning pages block 338 do not deform during page turning, the turning pages block 338 appears rather rigid and does not appear as a piece of paper would appear if turned in an actual physical book.

As discussed above, it is possible to create a more realistic page turning effect by creating a set of page shapes at a preprocessing stage corresponding to different points along a page turning path, and applying a preprocessed page shape to an individual page as it is rotated. For example, if the turning pages block 338 was turned in an actual, physical, book, the turning pages block would have a different geometric shape corresponding to different points along a traveled path as the turning pages block 338 traveled from one side of the book, such as, the right side pages block 334 to the other side of the book, such as, the left side pages block 332. During page turning, the set of pre-computed page shapes can be applied to a page to derive a specific page shape (i.e., a "turning" page shape) at a specific frame corresponding to a specific point of page turning as the page turns from one side of the book to the other side of the book. The set of page shapes can be constructed by a person of skill in the art. Alternatively, the sets of page shapes can be automatically computed using a mathematical simulation model.

In "How to Turn the Page," Proceedings of JCDL, 2003, pages 186-188, Yi-Chun Chu discloses a prototype page-turning system that animates full three-dimensional page turns. In "How to Turn the Page," dynamic page turning behavior is pre-computed by a mass-spring cloth simulation model defined on a rectangular grid of particles. The cloth simulation model gives the page turns, as viewed by a reader, a "stretchy" effect which is, generally, unrealistic in the modeling of stiffer objects, such as a book's pages. Moreover, because of the iterative nature of the cloth simulation model, implementation of the prototype takes from minutes to hours to calculate a single page turning. Another disadvantage of the method disclosed in "How to Turn the Page" is that the method does not take into account how the shapes of the turning page deform or the manner by which a page turns as a function of where on the page a reader touches. Another drawback of the method disclosed in "How to Turn the Page" is that the page shapes are computed in a preprocessing stage based on the assumption that a rectangular grid of a certain resolution (e.g., 16×16 particles) will be used to model the page. This means that during a runtime stage the polygon mesh can only be represented with the same rectangular grid. That is, a polygon mesh of 32×32 vertices cannot be used to represent the turning page. This would be a potential problem if there is a need to dynamically change the polygon mesh of the turning page.

A turning page should possess certain characteristics and/or properties when viewed by a reader. These "turning page" properties should be preserved when a page is turned in a virtual book in order to provide a realistic page turning effect and keep the page turning effect natural and appealing to the reader. The properties of a "turning page" that should be preserved as the page is turned include 1) maintaining the smoothness of the curved page as the curved page is turned, 2) maintaining right angles at the corners of the page being turned, 3) minimizing the stretching or compressing of the page as it is turned, and 4) gradually changing the page shape according to where on the page the page is initially lifted in the act of page turning. By maintaining these properties and applying the computed page shape to a specific frame "on the fly," it is possible to deform a flat page into a curved shape and preserve the look and feel of a page being turned in an actual physical book.

Figure 19:
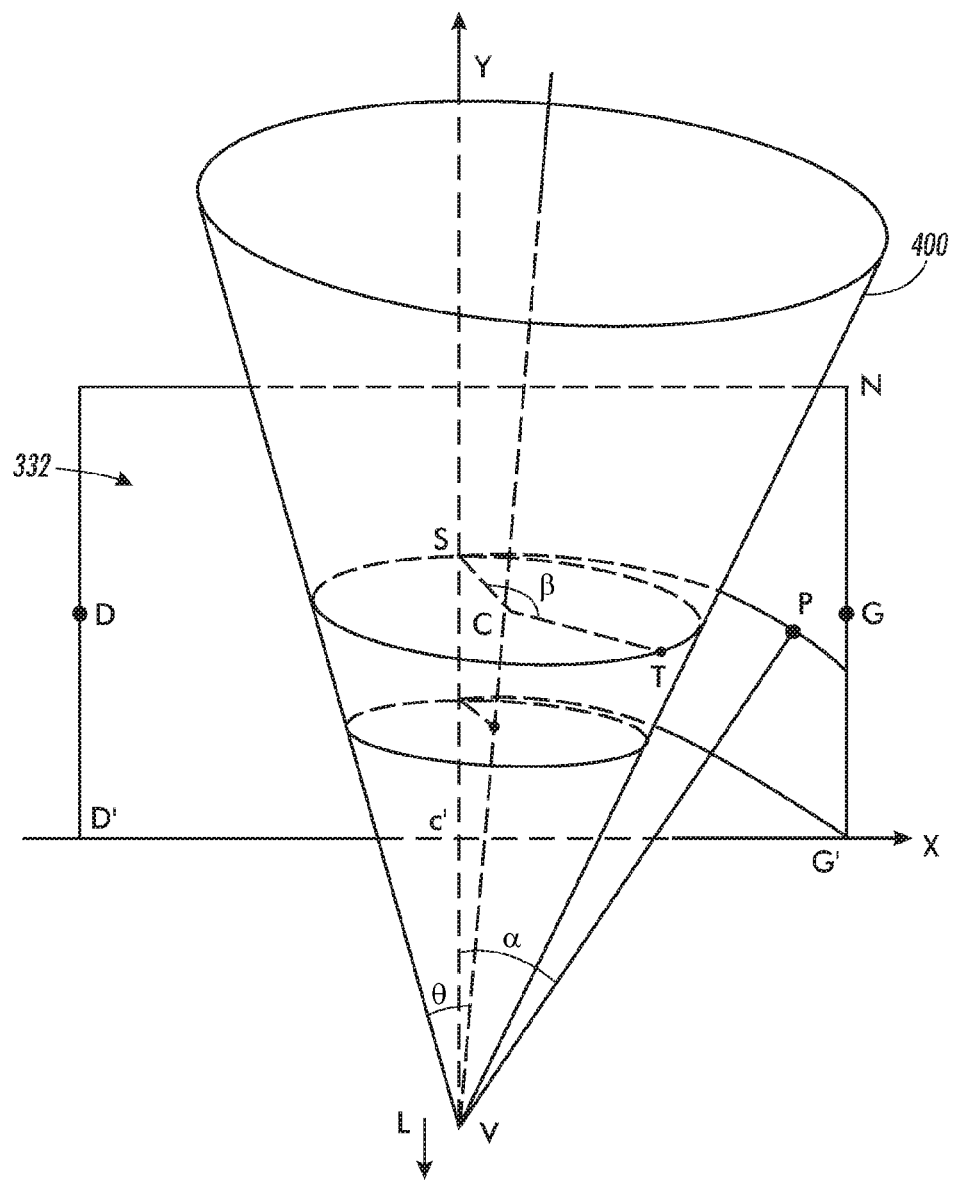
FIG. 19 illustrates exemplary embodiment of page turning, including deforming a turning pages block by mapping a point of the turning pages block to a point on an imaginary geometric shape.

FIG. 19 illustrates page deformation for the top face of the turning pages block 338. The deformation of the bottom face of the turning pages block 338 may be carried out in a similar manner; however, for ease of understanding, only the deformation of the top face of the turning pages block is discussed in detail below. Once the curved shapes of the top face and the bottom face are computed, other faces (e.g., left, right, front and back of the turning pages block) of the turning pages block can be easily constructed.

In FIG. 19, initially, the top face of a turning pages block 338 may correspond to the xy-plane. The bottom edge of the top face of the turning pages block 338, corresponding to line C'-G', aligns with the x-axis. The left edge of the top face of the turning pages block 338, corresponding to a line from the upper left corner of the page through line S-C', aligns with the y-axis. In the drawing as shown in FIG. 19, the z-axis is slightly skewed from a reader's view of the top face of the book. The yz-plane includes the cone's axis, e.g., a line corresponding to line V-C. A three-dimensional cone 400 is placed on the xy-plane. In this example, the side of the cone corresponding to line V-S may be placed on the y-axis. As such, as discussed above, the cone's axis V-C, in this example, is not parallel with the xy-plane; however, the axis is preferably in the yz-plane. The side of the cone corresponding to line S-V may be modeled to correspond to a book binding. The side of the cone may be modeled to hold the left edge of the top face of the turning pages block 338 still and allow the binding to move as shown by point C' in FIGS. 20-22, as the turning pages block 338 rotates from one side of the book to the other side of the book.

As discussed above, the deformation of the bottom face of the turning pages block 338 may be carried out in a similar manner. For example, in order to deform the bottom face, a cone is placed along a line which is parallel to the y-axis and goes through point J' (not shown in FIG. 19, see FIG. 21).

A reader turns the turning pages block 338 by touching a point of the turning pages block 338, such as, for example, point G'. The touching may be done by physically touching the display screen, if touch screen technology is used, or by, e.g., pointing and clicking using a mouse. After the reader has touched G', both the top face and bottom face of the turning pages block 338 begin deforming. The top face begins deforming by curling around the outer side of the cone 400. The bottom face begins deforming by curling around the outer side of a second cone 410 (see FIGS. 20 and 21). However, while a side of cone 400 is located at point C', a side of the second cone is located at point J' (see FIGS. 20 and 21). The curling of the top face and bottom face of the turning pages block 338 around the outer side of the cones 400, 410 results in a curved pages block. The cone angle θ and the y value for the cone apex V may be identical for each cone and can be varied over an animation time t' to obtain different views or phases of a turned pages block. The animation time t' corresponds to the total time required for turning the turning pages block 338 from one side of the book, corresponding to the right side pages block 336, to the other side of the book, corresponding to the left side pages block 332.

The cone angle θ and y value corresponding to the cone apex V may be identical for the cone 400 and the cone 410. However, it is possible for the turning of the top face of the turning pages block to be modeled using a different geometric shape than the geometric shape used for turning the bottom face of the turning pages block. Thus, the top face could be turned using a cone and the bottom face turned using a cylinder. Preferably, for ease of computations, a first geometric shape is used to model the top face and a second identical geometric shape is used to model the bottom face. The following describes turning a turning pages block using a first cone for the top face and a second identical cone for the bottom face.

Figure 20:
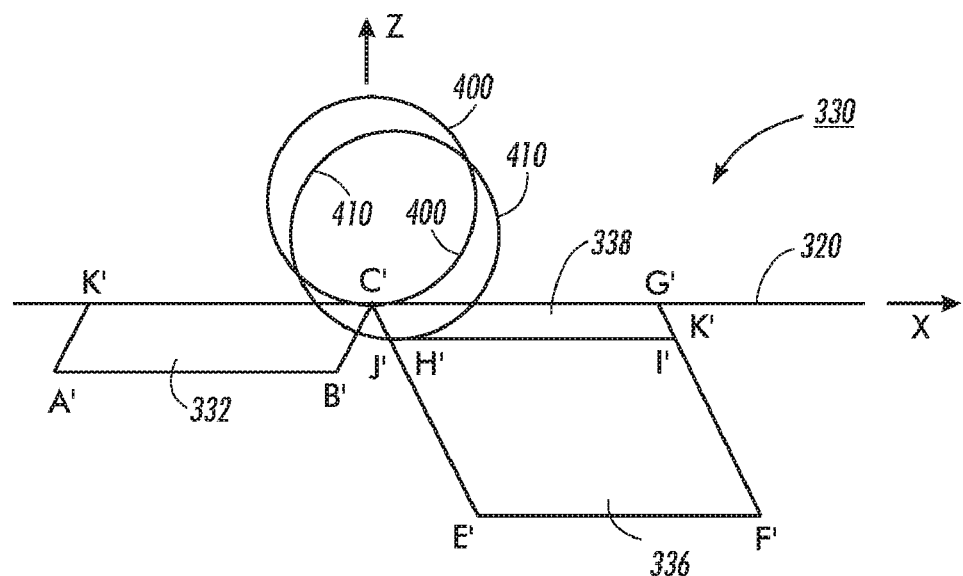
FIG. 20 illustrates exemplary page turning of the three-dimensional electronic book of FIG. 11 using the imaginary geometric shape shown in FIG. 19.

As shown in FIG. 20, prior to turning a page, e.g., prior to a reader touching point G' in order to turn the turning pages block 338, the cone angle θ for both cones, in this example, equals 90 degrees. As such, there is no page curling around the cones 400, 410 or, as may be alternatively understood, the page curling around the cones 400, 410 is flat. As the page turning progresses, for example, as shown in FIG. 21, the cone angle θ and the location of cone apex V of the cones 400, 410 gradually change. The cone angle θ and the location of cone apex V correspond to the location of the turning pages block 338 as the turning pages block 338 rotates from the right side pages block 336 to the left side pages block 332.

For example, as the turning pages block 338 rotates from the right side pages block 336 to the left side pages block 332, the cone angle θ gradually falls from 90 degrees at the beginning of the page turning animation to a minimum cone angle θ once half of the page deformation has occurred. The minimum cone angle θ and/or the point equal to one-half of the page deformation may coincide with half of the total animation time t'. As shown in FIG. 19, as the cone angle θ begins to change, the location of cone apex V corresponding to the y-axis moves down the y-axis in direction of arrow L towards negative infinity. Because the points of the top face and the bottom face of the turning pages block 338 are mapped to corresponding points on the imaginary cones 400, 410, as the shape of each cone changes (e.g., as each cones' angle θ and cone apex location V change), the turning pages block 338 is deformed as the points of the top face and bottom face of the turning pages block 338 are mapped to different shaped cones 400, 410 in each successive frame of the page turning animation. Thus, as point P is mapped from one cone shape to the next, the page curls up from the xy-plane around the outer side of the cone 400 with its lower right corner corresponding to G' lifted first. As such, G' is deformed and turned ahead of the rest of the turning pages block 338.

After the turning pages block 338 reaches the halfway point of the deformation process, the cone angle θ for each cone gradually increases to 90 degrees and the cone apex V for each cone translates in the direction opposite to the direction of arrow L shown in FIG. 19. Thus, in the deformation process, the cone angle θ at first gradually decreases from 90 degrees to a minimum cone angle θ and the cone apex V translates in the direction of arrow L along the y-axis towards negative infinity. Then, upon the deformation process reaching a halfway point, the cone angle θ and cone apex location V simultaneously reach minimum values, whereupon the cone angle θ begins increasing towards 90 degrees and the cone apex location V reverses direction opposite to the direction of the arrow L and heads toward the origin C' or J' for cone 400, 410, respectively. Thus, in exemplary embodiments, the second half of the deformation process can be a mirror image of the first half of the deformation process.

For example, at any given point of time t', as shown in FIG. 19, a given point P ($P_x$,$P_y$,0) on the top face of the turning pages block 338 maps to a specific point on the cone 400. The specific point on the cone 400 that point P maps to can be calculated by drawing a circle of radius R=|VP|= $\sqrt{P_x^2+(P_y-V_y)^2}$ around V on the xy-plane, corresponding to a specific cone, where R corresponds to the length of line V-P. The intersection between the circle and the y-axis is denoted as point S. Based on cone geometry, as the top face of turning pages block 338 is wrapped around the cone 400, arc $\widehat{SP}$ coincides with a circular cross section that is parallel to the base of the cone and intersects point S. Given that point P maps to point T on the cone's cross section, $|\widehat{ST}|=|\widehat{SP}|$. Denoting the center of the cross section as C and the angle $\lfloor SCT$ as $\beta$, the following formula is developed:

$$\beta = \frac{|\widehat{ST}|}{r} = \frac{|\widehat{SP}|}{r} = \frac{\alpha R}{R\sin\theta} = \frac{\alpha}{\sin\theta}$$

where r is the radius of the cross section (r corresponds to line C-T) and $$\alpha = \angle SVP = \arcsin\left(\frac{P_x}{R}\right).$$

Point T ($T_x$, $T_y$, $T_z$) can be computed by rotating point S around a line (x=0, z=r) by $\beta$ to point S' ($S_x'$, $S_y'$, $S_z'$), and then rotating S' around line (y=$S_y$, z=0) by $\theta$. In other words, point T can be computed as $$T_x = S_x' = r\cos\left(\beta - \frac{\pi}{2}\right) = r\sin\beta,$$
$$T_y = S_y' - S_z'\sin\theta = R + V_y - r(1-\cos\beta)\sin\theta,$$
$$T_z = S_z'\cos\theta = r(1-\cos\beta)\cos\theta.$$

The functions $\theta(t)$ and $V_y(t)$ may be empirically constructed to ensure a smooth animation. The combination of the translation, rotation and deformation of the turning pages block is discussed in detail below.

The same computations used above for determining where a given point on the top face of the turning pages block 338 maps to may be used for determining where a given point on the bottom face of the turning pages block 338 maps to.

FIGS. 20-23 illustrate exemplary states of the rotation, translation, and deformation of the turning pages block 338 during the page turning animation in which the turning pages block rotates 180 degrees in a counter-clockwise direction, with regard to the initial starting position shown in FIG. 13. The following discussion describes the movement of the left side pages block 332, the right side pages block 336, and the turning pages block 338 in greater detail.

As shown in FIG. 19, a geometric shape, such as a circular cone 400, is located on the xy-plane. Because only the top face of the turning pages block 338 is shown, only one geometric shape 400 is shown. However, as discussed above, another geometric shape may be used to calculate the turning of the bottom face of the turning pages block. At the beginning of page turning, the second geometric shape may be offset in the positive x-direction for page turning from right to left, and in the negative Z direction. As discussed above, the second geometric shape may be identical to the first geometric shape. In FIG. 19, the side of the cone 400, used for deforming the top face of the turning pages block 338, may initially touch the xy-plane along the y-axis and at point C'. However, the side of the cone moves in relation to the y-axis as the side of the cone moves in relation to point C' as point C' translates during the rotation of the top face of the turning pages block 338.

FIG. 20 illustrates a view of a cutting plane through the left side and right side of an opened book. FIG. 20 shows cones 400, 410, corresponding to the top and bottom faces of the turning pages block 338, respectively. As can be seen from FIG. 20, even though the base of the cones 400, 410 are circular, the cutting view of the cones 400, 410 would be slightly elliptical since each cone axis is skewed from the view of the Figure. Each cone's size, including cone angle $\theta$ and cone apex V, changes depending on the specific point of animation time t' (i.e., the specific frame of page turning as the page turns from one side of the book to the other side of the book). As such, the cones 400, 410 shown in FIGS. 20-21 are not necessarily drawn to a specific scale. In FIG. 20 for example, because the page turning animation has not yet begun, the cone angle $\theta$ for each cone equals 90 degrees. The cones 400, 410 shown in FIG. 21, on the other hand, have a cone angle $\theta$ of less than 90 degrees.

As discussed above, specific cone shapes for the top and bottom faces of the turning pages block are generated for each frame of the page turning process. The shape of the cones are determined based on factors such as where the reader initially touches the turning pages block and the specific point of rotation of the turning pages block along the page turning travel path (i.e., point during the animation time t'). For example, although the embodiments discussed throughout the specification correspond to turning pages from the lower right corner of the right side pages block, it is also possible to use the methods and systems discussed herein to turn pages from other locations on the page. For example, a right side pages block could also be turned from the upper right corner of the page. In this case, the cones 400, 410 would be turned 180 degrees relative to the common boundary between the right side pages block and the left side pages block. The processes described herein could then be applied to create and turn a turning pages block, whereupon the upper right corner of the turning pages block, e.g. point N of FIG. 19, would be lifted first, and turned ahead of other points of the turning pages block.

The page turning animation refers to the cumulative frames the reader views as the turning pages block rotates, translates, and deforms from one side of a book binding, for example, as shown in FIG. 20, the right side pages block 336, to the left side pages block 332, during the animation time t'. Each frame is generated based on the rotation, translation, and deformation processes and corresponds to a specific point of the turning pages block's travel path.

FIGS. 20-23 illustrate exemplary page turning of a three-dimensional electronic book using the technology described above in connection with FIG. 19 to rotate, translate, and deform the turning pages block. FIGS. 20-23 illustrate a view of a cutting plane of a visual book taken along the x-axis.

FIG. 20 illustrates a cross section of the pages of, e.g., FIG. 11. FIG. 20 shows a frame of a turning animation just prior to a turning pages block 338 being turned. Base line 320 corresponds to the top faces of the left and right side pages blocks. Because the turning pages block is not yet being turned, the cone angles $\theta$ are equal to 90 degrees. As discussed above, a user touches a point on the page block to begin the page turning animation.

As illustrated in FIG. 21, the turning pages block 338 rotates, in the direction of arrow 340, around point J',H'. As the turning pages block 338 rotates, point J',H' moves toward the static base line 320 along an upward direction toward the position where point C' was located at the beginning of the animation, e.g., along the direction of line J-C of FIG. 13. However, throughout the animation, the left side pages block 332 and the turning pages block 338 remain connected at the point C', resulting in a downward translation 350 of the left side pages block 332 away from the static base line 320. Similarly, concurrent with the movement of the left side pages block 332, the right side pages block 336 and the turning pages block 338 remain connected at the point J',H' which results in an upward translation 360 of the right side pages block 336 towards the static base line 320.

At the same time as the turning pages block 338 rotates around point J',H', the top face and bottom face of the turning pages block 338 are mapped to cones 400, 410, respectively, and curl around the side of the cone that touches point C' or J', respectively. As discussed above with reference to FIG. 19, the top face of the turning pages block 338 deforms because, e.g., the points (e.g., points G' and P) of the top face of the turning pages block 338 correspond to points on the cone 400. As the points on the cones 400, 410 change in relation to animation time t' because each cone's shape changes (or, as may be alternatively understood, specific shaped cones 400, 410 are generated for each frame of the page turning animation), the turning pages block 338 deforms by curling its top face around cone 400 and its bottom face around cone 410. As discussed above, once the page turning animation begins and the page begins to deform by curling around the cones 400, 410, the cone angle θ for each cone falls from 90 degrees and the cone apex V for each cone moves in the direction of arrow L. The next page turning animation frame is then computed with each cone having a cone angle θ less than 90 degrees and a y value of cone apex V located farther down the y-axis.

Figure 22:
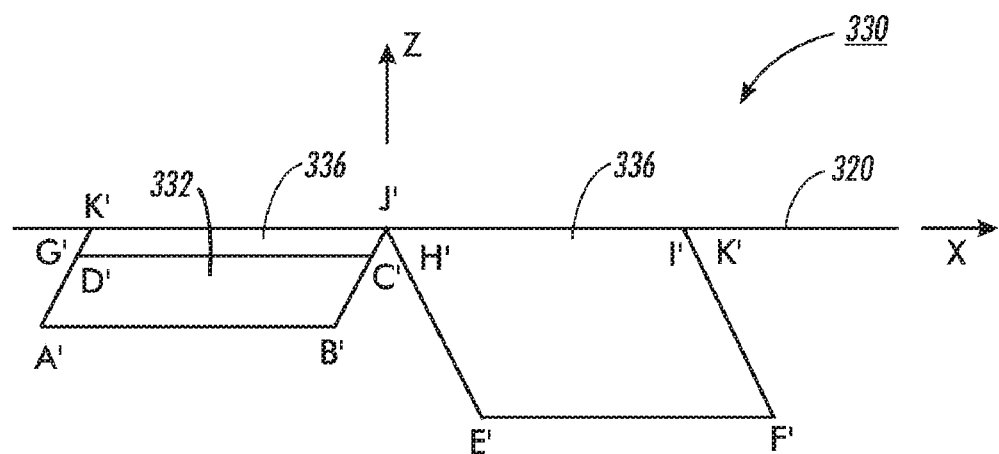
FIGS. 22 and 23 illustrate exemplary states of the three-dimensional electronic book of FIG. 11 at the end of rotating the turning pages block.

As shown in FIG. 22, after the turning pages block 338 has rotated 180 degrees counter-clockwise from the initial page turning position, the side faces corresponding to B'-C' and A'-D' of the left side pages block 332 become collinear with the side faces corresponding to lines C'-J' and G'-K' of the turning pages block 338, respectively. Additionally, the top face, corresponding to line K'-J', of the turning pages block 338, and the top face, corresponding to line J'-I', of the right side pages block 336, are collinear with the base line 320.

Figure 23:
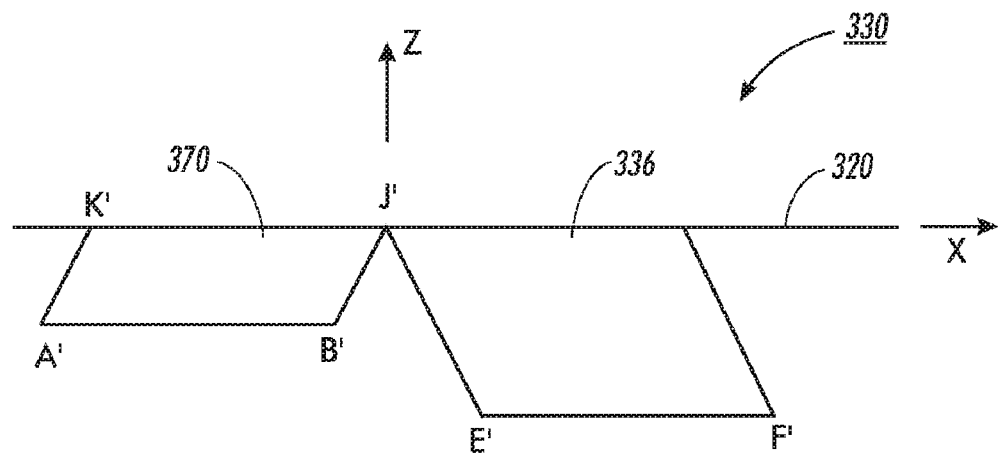

FIG. 23 illustrates an exemplary state of the three-dimensional electronic book in an opened position 330 at the end of the page turning animation. As shown in FIG. 23, a new left side pages block 370 is created as a result of merging the turning pages block 338 with the left side pages block 332 of FIG. 22. Thus, the top face, corresponding to line K'-J', of the new right side pages block 370, and the top face, corresponding to line J'-I', of the right side pages block 336 are collinear with the base line 320.

Since the static state of the closed virtual book 310 in FIG. 10 does not have a left or right side pages block, the static state of the closed virtual book 310 is considered as a special case of the static state of the opened virtual book 330 in FIG. 11. In other words, in the closed virtual book 310, one of the right side pages block and the left side pages block can be considered as invisible. Thus, transitioning between a closed book 310 and an opened book 330 is similar to the transitioning between an opened book 330 in the static state of FIG. 20 and the opened book 330 in the static state of FIG. 23 as described above. Therefore, turning pages of a virtual book from/to an initial/final static state closed position 310 will not be discussed in detail. Thus, a reader can carry out the page turning operation (e.g., rotation, translation, and deformation) starting from a static state closed book or an opened book placed in a virtual environment. In other words, the page turning cycle starts from a book in a static state, such as, for example, as shown in FIG. 20, and goes through an animation as illustrated in FIGS. 21 and 22, which returns the book back to another static state, such as, for example, as shown in FIG. 23.

Figure 24:
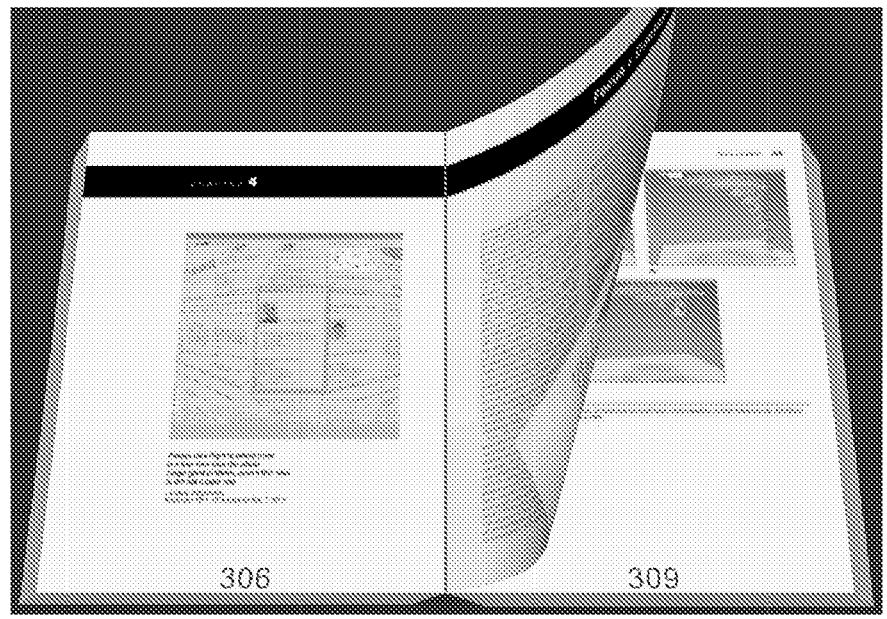
FIG. 24 illustrates an exemplary embodiment of a frame of a page turning animation at a time using the imaginary geometric shape shown in FIG. 19.
Figure 25:
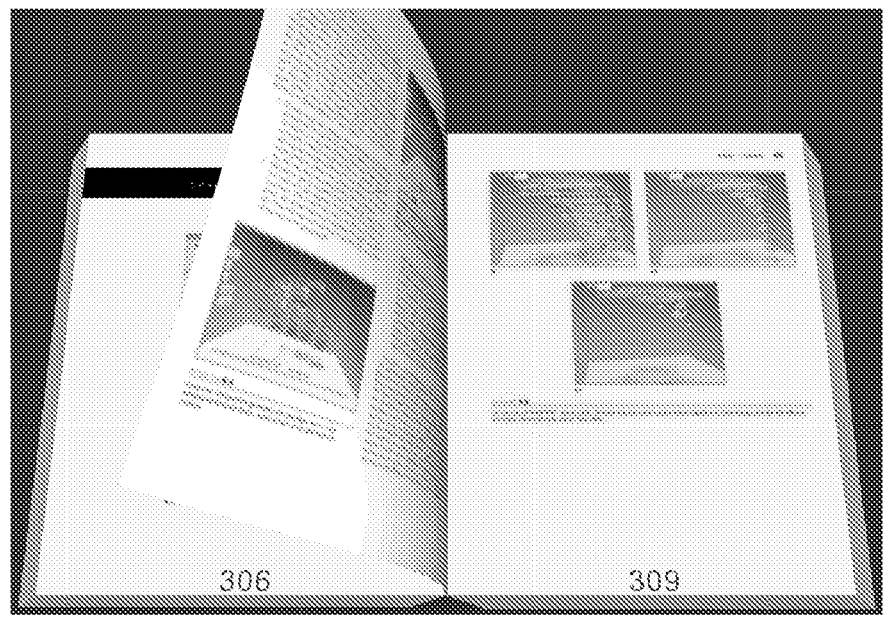
FIG. 25 illustrates an exemplary embodiment of a frame of a page turning animation at another time using the imaginary geometric shape shown in FIG. 19.

FIGS. 24 and 25 individually illustrate exemplary embodiments of a frame of a page during a page turning animation. FIG. 24 illustrates a page rotated at approximately 45 degrees and deformed corresponding to cones each with a cone angle θ of less than 90 degrees. FIG. 25 illustrates a page rotated at slightly less than 90 degrees and cone angles θ further reduced. Moreover, in the exemplary embodiment shown in FIG. 25, the y-value of the cone apex V for each cone is located further down the y-axis towards negative infinity, when compared to the exemplary embodiment shown in FIG. 24.

Figure 26:
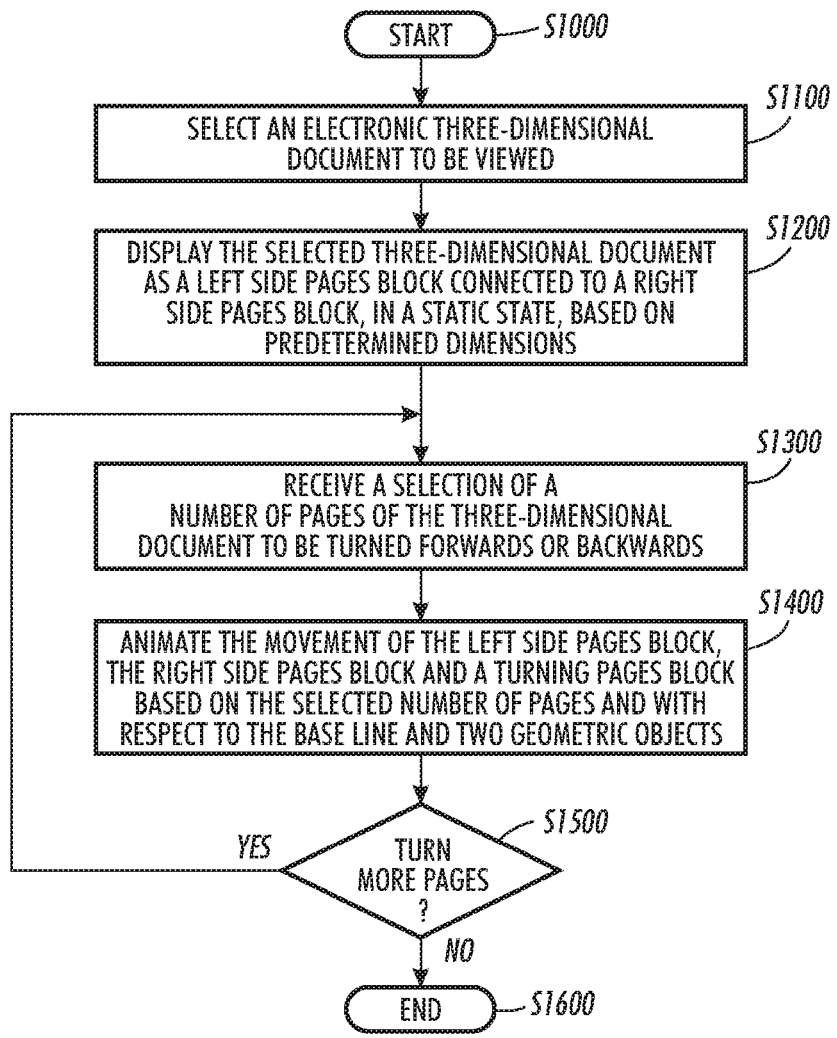
FIG. 26 is a flowchart outlining an exemplary method for turning pages of a three-dimensional electronic document.

FIG. 26 is a flowchart outlining an exemplary embodiment of the method for representing turning pages of a three-dimensional virtual document. As shown in FIG. 26, operation of the method begins in step S1000, and continues to step S1100, where a three-dimensional document to be viewed is obtained by a reader. Then, in step S1200, the selected three-dimensional document is displayed as a left side pages block connected to a right side pages block, in a static state, based on predetermined dimensions. Next, in step S1300, a number of pages to be turned, either forwards or backwards, is selected by the reader. The selection of the number of pages may be direct or indirect. An example of direct selection is when the reader types in a number, such as "10." In the case of direct selection, the system can decide where to curl the page first, e.g., following what was done in the last page turning, or in a random manner. An example of indirect selection is when the reader simply touches a currently displayed page, and the system understands that only that page is to be turned. Operation then continues to step S1400.

In step S1400, the movement of the left side pages block, the right side pages block, and the turning pages block is animated based on the selected number of pages and with respect to a plane formed by a static base line and two geometric objects each with a side placed parallel with the y-axis. Then, in step S1500, a determination is made whether more pages are to be turned. This determination may be based on, for example, whether all of the pages of the document have been turned or whether the page has been opened for at least a predetermined amount of time. If so, operation jumps back to step S1300. Otherwise, operation of the method continues to step S1600, where operation of the method ends.

Figure 27A:
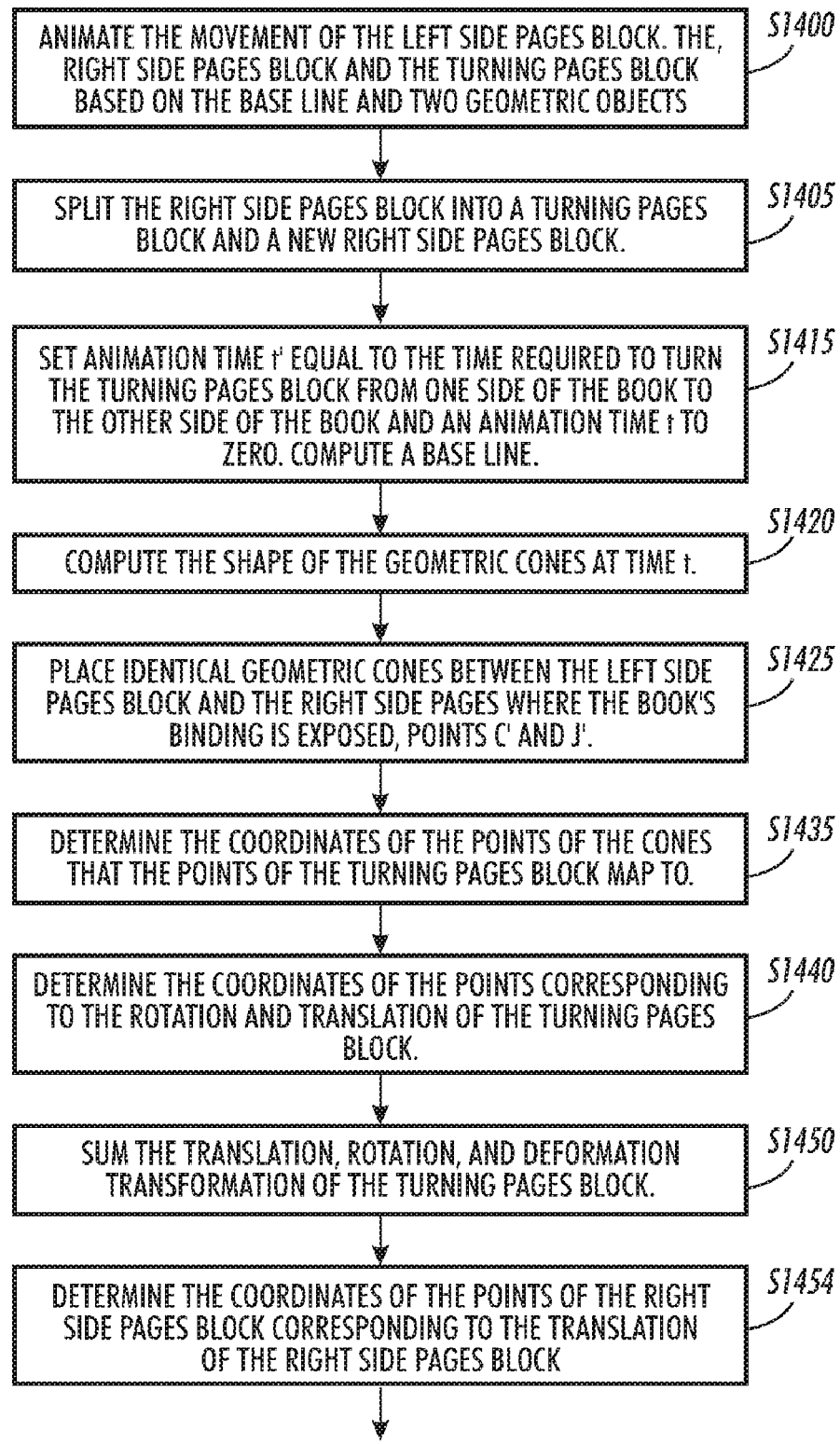
FIG. 27 is a flowchart outlining an exemplary method for animating the movement of the left side pages block, the right side pages block and a turning pages block based on the selected number of pages and with respect to a base line and two geometric objects.
Figure 27B:
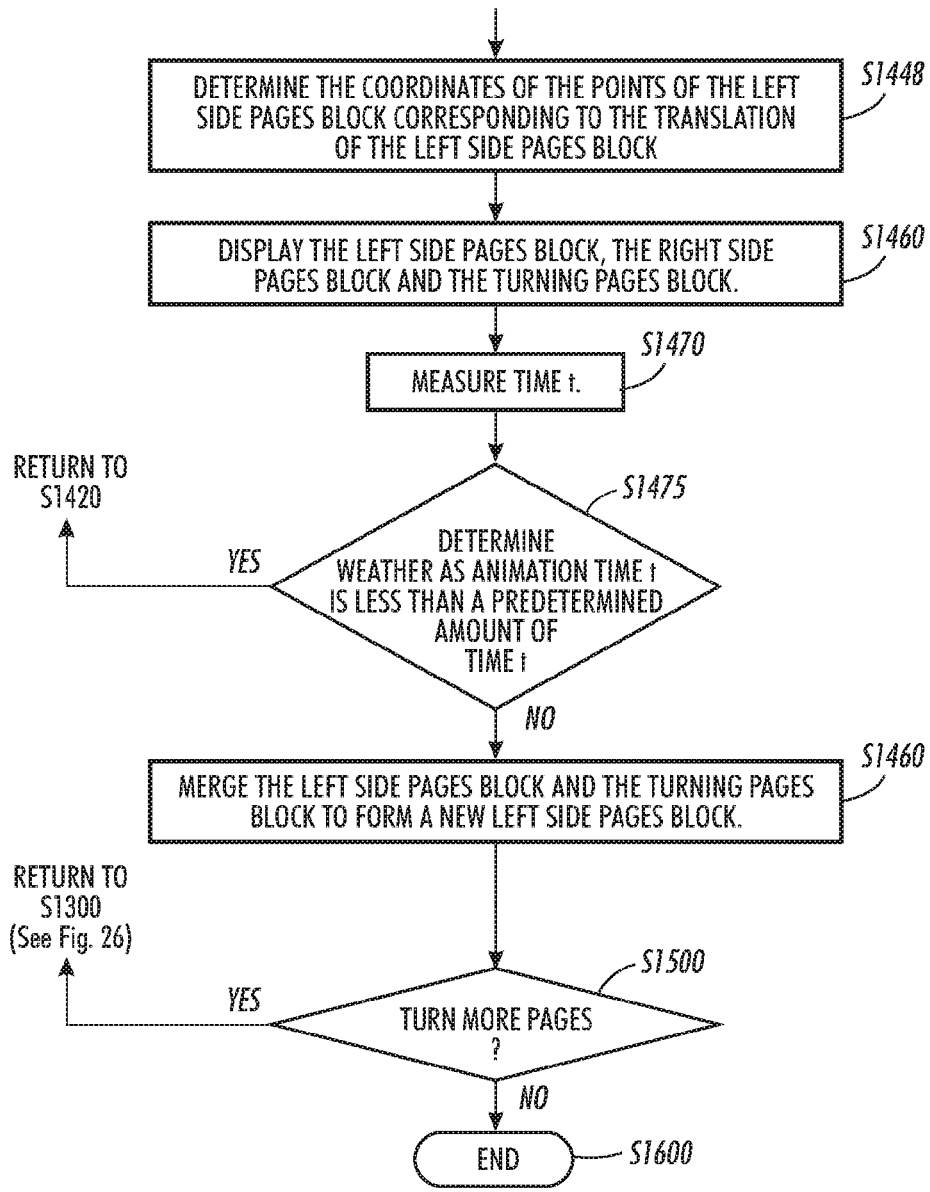

FIG. 27 is a flowchart outlining an exemplary method for animating the movement of the left side pages block, the right side pages block and the turning pages blocks based on the selected number of pages and with respect to a base line and two geometric objects.

Operation of the method begins in step S1400, and continues to step S1405, where, e.g., the right side pages block is split into a turning pages block and a new right side pages block. As discussed previously, the turning pages block is a first portion representing the number of pages to be turned and the new right side pages block is a second portion representing the pages that remain in the right side pages block after the first portion has been removed. As previously discussed, the thickness of the turning pages block may be determined by multiplying the number of pages to be turned and the thickness of an individual page; the thickness of the new right side pages block may be the difference between the initial right side pages block and the turning pages block; and the top face of the left side page block and the top face of the turning pages block may remain collinear with the base line. The coordinates of the left side pages block, the right side pages block and the turning pages block are initially calculated. Operation then continues to step S1415.

In step S1415 an animation time t' time is set to equal the time required to turn the turning pages block from one side of the book to the other side of the book, and an animation time t is set to zero. Concurrently, the coordinates of a base line are computed.

Next, in step S1420, the coordinates of the three-dimensional geometric shapes, such as, the geometric cones are computed at time t.

In step S1425, identical geometric cones are placed between a left side pages block and a right side pages block and where the book's binding is exposed, e.g., points C' and J' of FIG. 20. The cones are placed at C' and J' to deform the top face and the bottom face of the turning pages block concurrently.

Then, in step S1435, the coordinates for the selected point on the top face of the turning pages block at which page turning is to begin, e.g., point G' of FIG. 19, and its corresponding point on the cone, are determined based on a function of the geometry of the cone located at point C' for a specific cone angle and cone apex location. Simultaneously, the coordinates of the other points on the cone located at point C' that the remaining points on the top face of the turning pages block map to are calculated based on the geometry of the cone located at point C'. Concurrently, the coordinates of the points on the cone located at point J' that the points on the bottom face of the turning pages block map to are calculated based on the geometry of the cone located at point J'.

In step S1440, the coordinates of the points corresponding to the rotation and translation of the turning pages block are calculated.

Next, in step S1450, the translation, rotation and deformation transformations of the turning pages block are summed. For example, the turning pages block deforms by mapping the points (e.g., point P) of the turning pages block to their corresponding points on the cone (e.g., point T). Simultaneously, the turning pages block translates and rotates about the virtual book binding. Because the points, e.g., C',J',H' and P, at an animation time t may be determined, the location of points C',J',H' and P, as well as the remaining points of the turning pages block, can be determined at specific point during the animation time t' whether the turning pages block moves at a relatively constant speed, or a variable speed.

Next, in step 1454, the coordinates of the points of the right side pages block corresponding to the translation of the right side pages block are determined. During the animation, the right side pages block, e.g., E' F' I' H' of FIG. 21, is translated upward based on the movement of point(s) J',H' of the turning pages block. The right side pages block, e.g., E' F' I' H' of FIG. 21, may remain connected to the turning pages block throughout the animation. Then, in step S1458, the coordinates of the points of the left side pages block corresponding to the translation of the left side pages block are determined. The left side pages block, e.g., A'B'C'D' of FIG. 21, is translated downwards based on the movement of, e.g., point C', of the turning pages block. The left side pages block, e.g., A'B'C'D', may remain connected to the turning pages block throughout the animation.

Next, in step S1460, the left side pages block, the right side pages block and the turning pages block are displayed.

Then, in step S1470, a time measurement is taken and t is set to be the time elapsed since the beginning of the page turning animation. In step S1475, a determination is made whether the animation time t is less than the predetermined amount of time t'. As discussed above, the predetermined amount of time t' corresponds to the length of time required for the turning pages block to turn from the right side pages block to the left side pages block. If so, operation jumps back to step S1420 where steps S1420 through S1470 are repeated. Otherwise, operation jumps to step S1480.

In step S1480, the left side pages block and the turning pages block are merged to form a new left side pages block. For example, as shown in FIGS. 22 and 23, a new left side pages block is created as a result of merging the turning pages block with the initial left side pages block. Thus, the top face of the new left side pages block and the top face of the new right side pages block are collinear with the static base line. Operation then continues to step S1500 which corresponds to step S1500 of FIG. 26.

Figure 28:
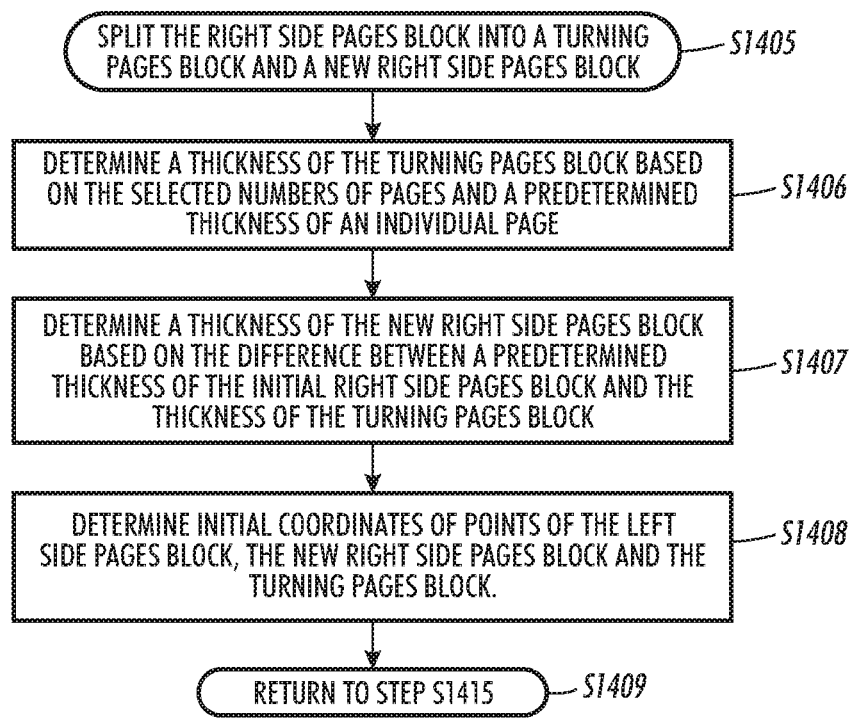
FIG. 28 is a flowchart outlining an exemplary method for determining coordinates of points of a left side pages block, a right side pages block and a turning pages block.

FIG. 28 is a flowchart outlining in greater detail an embodiment of a method for determining coordinates of points of the left side pages block, the right side pages block, and the turning pages block at animation time t=0. As shown in FIG. 28, operation of the method begins in step S1405, and continues to step S1406. In step S1406, the thickness of the turning pages block is determined based on the selected number of pages to be turned and a predetermined thickness of an individual page. Then, in step S1407, the thickness of the new right side pages block is determined based on the difference between a predetermined thickness of the initial right side pages block and the thickness of the turning pages block. Next, in step S1408, initial coordinates of points of the left side pages block, the new right side pages block and the turning pages block are determined. Operation then continues to step S1409, where operation of the method returns to step S1415 of FIG. 27.

Figure 29:
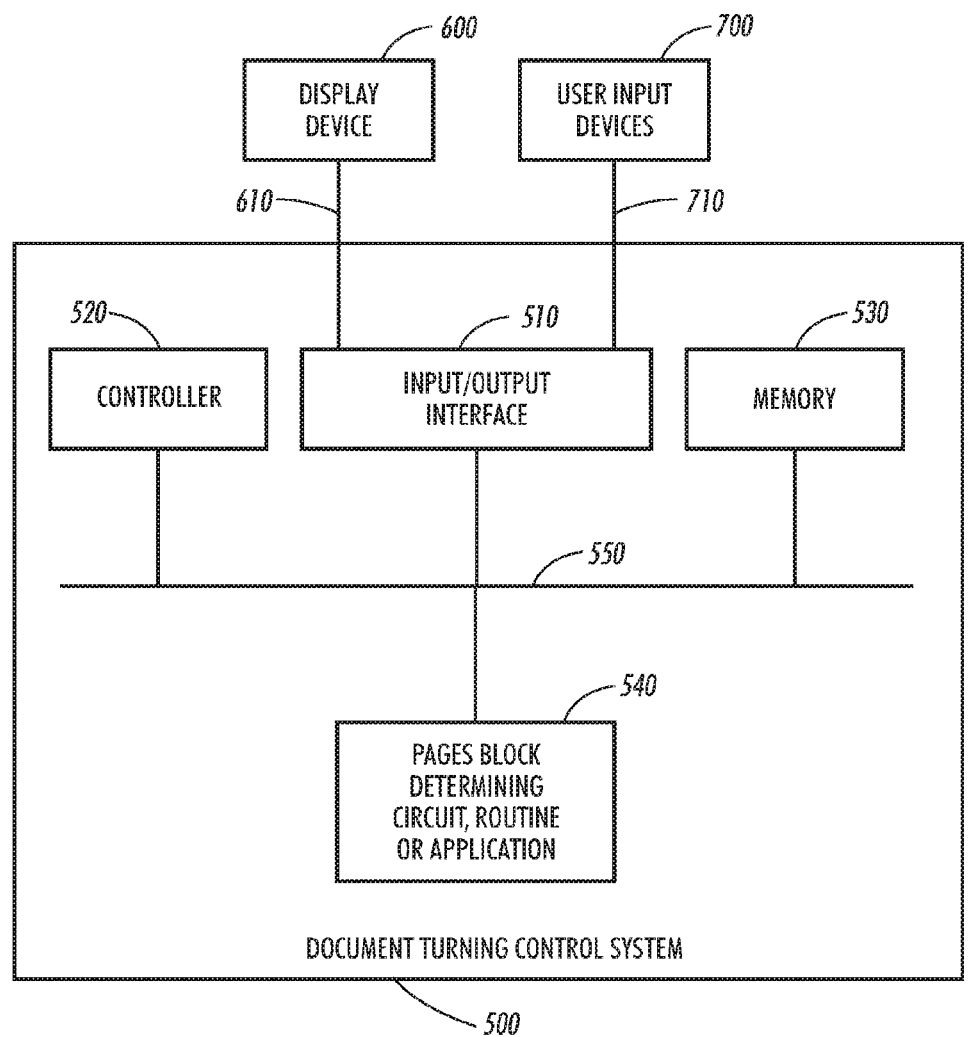
FIG. 29 is a block diagram outlining an exemplary embodiment of a system for turning and displaying pages of a three-dimensional electronic document.

FIG. 29 is a functional block diagram outlining an exemplary embodiment of a document turning control system 500. As shown in FIG. 29, the document turning control system 500 includes an input/output interface 510, a controller 520, a memory 530, and a pages block determining circuit, routine or application 540, each appropriately interconnected by one or more control and/or data buses 550. The input/output interface 510 is linked to a display device 600 by a link 610, and one or more user input devices 700 by one or more links 710.

Each of the links 550, 610 and 710 can be any known or later-developed connection system or structure usable to connect their respective devices to the document turning control system 500. It should also be understood that links 550, 610 and 710 do not need to be of the same type.

The memory 530 can be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The user input devices 700 can be one or more of a touch pad, a touch screen, a track ball, a mouse, a keyboard, a stylus or any known or later-developed user input devices 700 for inputting data and/or control signals to the document turning control system 500 for turning pages of the three-dimensional electronic document.

In general, the display device 600 can be any device that is capable of displaying a virtual document and the movement of a left side pages block, a right side pages block and a turning pages block according to techniques such as those discussed above.

The pages block determining circuit, routine or application 540 receives a user input, and determines the dimensions and coordinates of a closed virtual book or an opened virtual book. Then, the pages block determining circuit, routine or application 540 determines the dimensions and point coordinates of the left side pages block, the right side pages block, and the turning page block for rotation, translation, and deformation processes at animation time t.

The exemplary embodiment of a document turning control system for turning pages of a three-dimensional electronic document according to FIG. 29 may operate in the following manner.

In operation, user input is output from the user input device(s) 700 over link 710 to the input/output data interface 510 of the document turning control system 500. The user input includes information regarding the virtual document to be viewed and the number of pages to be turned forwards or backwards and where on the document is touched by the user. Variables relating to, e.g., the changing cone shape (e.g., minimum and maximum values for cone angles and cone apex locations) may be input by the user or programmed into the pages block determining circuit, routine, or application 540. The controller 520 inputs the user input information into the pages block determining circuit, routine or application 540.

The controller 520 controls the pages block determining circuit, routine or application 540 to determine a thickness of the turning pages block based on the selected number of pages and a predetermined thickness of the individual page, and splits the right side pages block into a turning pages block and a new right side pages block. Next, the controller 520 controls the pages block determining circuit, routine or application 540 to determine the location of the static base line and geometric shape to be used in the rotation and deformation processes. Then, the controller 520 controls the pages block determining circuit, routine or application 540 to determine the point coordinates of all defining the left side pages block, the right side pages block and the turning pages block for rotation, translation, and deformation processes at animation time t. Finally, the controller 520 controls the display device 600 to display the animation as the left side pages block, right side pages block and the turning pages block rotate, translate and deform during the turning process.

While exemplary embodiment have been described as outlined above, these embodiments are intended to be illustrative and not limiting. Various changes, substitutes, improvements, or the like may be made without departing form the spirit and scope of the invention.

What is claimed is:

1. A method for animating a turning of a turning portion of an electronically represented three-dimensional object by a computer, the method including:
   dividing an animation of a turning portion of a an electronically represented three-dimensional object into at least a first plurality of animation frames and a second plurality of animation frames; and
   deforming the turning portion of the three-dimensional object by curling at least a part of the turning portion about an imaginary cone, the imaginary cone having a cone apex, a cone side, a cone axis, and a cone angle defined as an angle between the cone axis and the cone side,
   the curling including mapping a point on the turning portion to a point on the imaginary cone for each of the first plurality of animation frames and the second plurality of animation frames, the mapping the point on the turning portion to the point on the imaginary cone further comprising:
   defining a first circle with a center at the cone apex and intersecting the point on the turning portion;
   defining a second circle around the imaginary cone and intersecting an intersecting point corresponding to the intersection of the cone side and the first circle; and
   mapping the point on the turning portion to the point on the cone on the second circle a distance along the circle from the intersecting point equal to an arc length from the point on the turning portion to the intersecting point along the first circle, wherein
   between subsequent frames in the first plurality of animation frames, the cone angle gradually decreases from around 90° to a first predetermined minimum cone angle, and the cone apex moves substantially along the cone axis from a first apex position closer to the turning portion of the three-dimensional object to a second apex position farther from the turning portion of the three-dimensional object, and
   between subsequent frames in the second plurality of animation frames, the cone angle gradually increases from a second predetermined minimum cone angle to around 90°, and the cone apex moves substantially along the cone axis from a third apex position farther from the turning portion of the three-dimensional object toward a fourth apex position closer to the turning portion of the three-dimensional object.

2. The method of claim 1, wherein coordinates of the point on the imaginary cone are calculated based on the cone angle and the cone apex.

3. The method of claim 1, further comprising:
   separating the three-dimensional object into the turning portion, a first non-turning portion and a second non-turning portion, the first and second non-turning portions being connected to the turning portion at first and second connections, respectively; and
   maintaining the first connection and the second connection while animating the turning of the turning portion.

4. The method of claim 1, wherein the three-dimensional object is an electronic document, and the turning portion includes at least one page of the electronic document.

5. The method of claim 4, wherein the turning portion comprises multiple pages of the electronic document, turned as a single block.

6. The method of claim 5, wherein a size of the single block is determined based on user input indicating a number of pages to be turned at once.

7. A computer readable storage medium on which is recorded computer executable code, which, when executed by a computer, causes the computer to execute the method of claim 1.

8. The method according to claim 1, wherein the first predetermined minimum cone angle and the second predetermined minimum cone angle are the same.

9. The method according to claim 1, wherein the first apex position and the fourth apex position are the same, and the second apex position and the third apex position are the same.

10. The method according to claim 1, wherein the mapping occurs at each frame in the first plurality of animation frames and each frame in the second plurality of animation frames.

11. A method for turning portions of an electronically represented three-dimensional object, comprising:
   receiving user input indicating a location on the object; and animating a turning of a turning portion of the three-dimensional object by a computer, by
dividing the animating of the turning portion of the electronically represented three-dimensional object into at least a first plurality of animation frames and a second plurality of animation frames; and
deforming the turning portion of the three-dimensional object by curling at least a part of the turning portion about an imaginary cone, the imaginary cone having a cone apex, a cone side, a cone axis, and a cone angle defined as an angle between the cone axis and the cone side,
the curling including mapping a point on the turning portion to a point on the imaginary cone for each of the first plurality of animation frames and the second plurality of animation frames, the mapping the point on the turning portion to the point on the imaginary cone further comprising:
defining a first circle with a center at the cone apex and intersecting the point on the turning portion;
defining a second circle around the imaginary cone and intersecting an intersecting point corresponding to the intersection of the cone side and the first circle; and
mapping the point on the turning portion to the point on the cone on the second circle a distance along the circle from the intersecting point equal to an arc length from the point on the turning portion to the intersecting point along the first circle, wherein
between subsequent frames in the first plurality of animation frames, the cone angle gradually decreases from around 90° to a first predetermined minimum cone angle, and the cone apex moves substantially along the cone axis from a first apex position closer to the turning portion of the three-dimensional object to a second apex position farther from the turning portion of the three-dimensional object, and
between subsequent frames in the second plurality of animation frames, the cone angle gradually increases from a second predetermined minimum cone angle to around 90°, and the cone apex moves substantially along the cone axis from a third apex position farther from the turning portion of the three-dimensional object toward a fourth apex position closer to the turning portion of the three-dimensional object,
wherein the animation differs depending on the location indicated by the user.

12. The method of claim 11, wherein the three-dimensional object is an electronic document, and the turning portion includes at least one page of the electronic document.

13. A computer readable storage medium on which is recorded computer executable code, which, when executed by a computer, causes the computer to execute the method of claim 11.

14. A controller for turning portions of an electronically represented three-dimensional object, the controller animating a turning of a turning portion of the three-dimensional object, the animating including:
dividing an animation of a turning portion of a an electronically represented three-dimensional object into at least a first plurality of animation frames and a second plurality of animation frames; and
deforming the turning portion of the three-dimensional object by curling at least a part of the turning portion about an imaginary cone, the imaginary cone having a cone apex, a cone side, a cone axis, and a cone angle defined as an angle between the cone axis and the cone side,
the curling including mapping a point on the turning portion to a point on the imaginary cone for each of the first plurality of animation frames and the second plurality of animation frames, the mapping the point on the turning portion to the point on the imaginary cone further comprising:
defining a first circle with a center at the cone apex and intersecting the point on the turning portion;
defining a second circle around the imaginary cone and intersecting an intersecting point corresponding to the intersection of the cone side and the first circle; and
mapping the point on the turning portion to the point on the cone on the second circle a distance along the circle from the intersecting point equal to an arc length from the point on the turning portion to the intersecting point along the first circle, wherein
between subsequent frames in the first plurality of animation frames, the cone angle gradually decreases from around 90° to a first predetermined minimum cone angle, and the cone apex moves substantially along the cone axis from a first apex position closer to the turning portion of the three-dimensional object to a second apex position farther from the turning portion of the three-dimensional object, and
between subsequent frames in the second plurality of animation frames, the cone angle gradually increases from a second predetermined minimum cone angle to around 90°, and the cone apex moves substantially along the cone axis from a third apex position farther from the turning portion of the three-dimensional object toward a fourth apex position closer to the turning portion of the three-dimensional object.

15. The controller of claim 14, wherein coordinates of the point on the imaginary cone are calculated based on the cone angle and the cone apex.

16. The controller of claim 14, wherein the controller:
separates the three-dimensional object into the turning portion, a first non-turning portion and a second non-turning portion, the first and second non-turning portions being connected to the turning portion at first and second connections, respectively; and
maintains the first connection and the second connection while animating the turning of the turning portion.

17. The controller of claim 14, wherein the three-dimensional object is an electronic document, and the turning portion includes at least one page of the electronic document.

18. The controller of claim 17, wherein the turning portion comprises multiple pages of the electronic document, turned as a single block.

19. The controller of claim 18, wherein a size of the single block is determined based on user input indicating a number of pages to be turned at once.

20. A system including the controller of claim 14.

21. A controller for turning portions of an electronically represented three-dimensional object, the controller:
receiving user input indicating a location on the object; and
animating a turning of a turning portion of the three-dimensional object, by
dividing the animating of the turning portion of the electronically represented three-dimensional object into at least a first plurality of animation frames and a second plurality of animation frames; and
deforming the turning portion of the three-dimensional object by curling at least a part of the turning portion about an imaginary cone, the imaginary cone having a cone apex, a cone side, a cone axis, and a cone angle defined as an angle between the cone axis and the cone side, the curling including mapping a point on the turning portion to a point on the imaginary cone for each of the first plurality of animation frames and the second plurality of animation frames, the mapping the point on the turning portion to the point on the imaginary cone further comprising:

defining a first circle with a center at the cone apex and intersecting the point on the turning portion;

defining a second circle around the imaginary cone and intersecting an intersecting point corresponding to the intersection of the cone side and the first circle; and mapping the point on the turning portion to the point on the cone on the second circle a distance along the circle from the intersecting point equal to an arc length from the point on the turning portion to the intersecting point along the first circle, wherein between subsequent frames in the first plurality of animation frames, the cone angle gradually decreases from around 90° to a first predetermined minimum cone angle, and the cone apex moves substantially along the cone axis from a first apex position closer to the turning portion of the three-dimensional object to a second apex position farther from the turning portion of the three-dimensional object, and between subsequent frames in the second plurality of animation frames, the cone angle gradually increases from a second predetermined minimum cone angle to around 90°, and the cone apex moves substantially along the cone axis from a third apex position farther from the turning portion of the three-dimensional object toward a fourth apex position closer to the turning portion of the three-dimensional object, wherein the animation differs depending on the location indicated by the user.

22. The controller of claim 21, wherein the three-dimensional object is an electronic document, and the turning portion includes at least one page of the electronic document.

23. A system including the controller of claim 22.

24. A method for animating a turning of a turning portion of an electronically represented three-dimensional object by a computer, the method including:

dividing an animation of a turning portion of a an electronically represented three-dimensional object into at least a first plurality of animation frames and a second plurality of animation frames; and deforming the turning portion of the three-dimensional object by curling a first part of the turning portion about a first imaginary geometric shape, the first imaginary geometric shape being a cone having a cone apex, a cone side, a cone axis, and a cone angle defined as an angle between the cone axis and the cone side, and curling a second part of the turning portion about a second imaginary geometric shape, the second imaginary geometric shape being different than the first imaginary geometric shape;

the curling including mapping a point on the first part of the turning portion to a point on the first imaginary geometric shape for each of the first plurality of animation frames and the second plurality of animation frames, and mapping a point of the second part of the turning portion to a point on the second imaginary geometric shape, wherein between subsequent frames in the first plurality of animation frames, the cone angle gradually decreases from around 90° to a first predetermined minimum cone angle, and the cone apex moves substantially along the cone axis from a first apex position closer to the turning portion of the three-dimensional object to a second apex position farther from the turning portion of the three-dimensional object, and between subsequent frames in the second plurality of animation frames, the cone angle gradually increases from a second predetermined minimum cone angle to around 90°, and the cone apex moves substantially along the cone axis from a third apex position farther from the turning portion of the three-dimensional object toward a fourth apex position closer to the turning portion of the three-dimensional object.

25. The method of claim 24, wherein the first part of the turning portion is a top face of a turning pages block and the second part of the turning portion is a bottom face of the turning pages block.

* * * * *